United States Patent [19]

Stephenson et al.

[11] Patent Number: 5,386,361
[45] Date of Patent: Jan. 31, 1995

[54] METHOD OF UNSTICKING MATERIAL DELIVERY APPARATUS

[75] Inventors: Stanley V. Stephenson; Mark Farabee; Max L. Phillippi; Ronald E. Dant; Russell D. Taylor, all of Duncan, Okla.

[73] Assignee: Halliburton Company, Duncan, Okla.

[21] Appl. No.: 84,822

[22] Filed: Jun. 29, 1993

[51] Int. Cl.⁶ .......................... G05B 9/02; B65G 33/14
[52] U.S. Cl. .................................. 364/184; 198/675; 222/63
[58] Field of Search ................. 198/675; 222/1, 63, 222/333, 412, 413; 318/114, 128, 434, 591, 744; 241/34, 36, 35, 32; 264/39, 40.1, 40.5; 364/184, 473, 476

[56] References Cited

U.S. PATENT DOCUMENTS

| Re. 30,068 | 8/1979 | Meyers | 318/114 |
|---|---|---|---|
| 3,452,774 | 7/1969 | Stanton . | |
| 4,004,739 | 1/1977 | Cramer | 241/34 |
| 4,353,482 | 10/1982 | Tomlinson et al. | 222/1 |
| 4,560,110 | 12/1985 | Burda | 241/36 |
| 4,751,648 | 6/1988 | Sears, III et al. . | |
| 4,779,186 | 10/1988 | Handke et al. . | |
| 4,901,181 | 2/1990 | Miyanaga et al. | 361/33 |
| 4,916,631 | 4/1990 | Crain et al. . | |
| 4,975,227 | 12/1990 | Kamiguchi | 264/39 |
| 5,018,668 | 5/1991 | Bauer | 198/675 |

FOREIGN PATENT DOCUMENTS 63-41307  2/1988  Japan .................................. 198/675

OTHER PUBLICATIONS

Halliburton Services general technical data brochure on the Automatic Proppant Control System (No. G-9156 (Rev.)) published prior to June. 29, 1992.

Primary Examiner—Roy N. Envall, Jr.
Assistant Examiner—Steven R. Garland
Attorney, Agent, or Firm—Stephen R. Christian; E. Harrison Gilbert, III

[57] ABSTRACT

A method of unsticking a material delivery apparatus comprises automatically generating and applying to the material delivery apparatus a cyclical drive signal that causes at least two levels of torque to be applied to the material delivery apparatus.

5 Claims, 2 Drawing Sheets

METHOD OF UNSTICKING MATERIAL DELIVERY APPARATUS

BACKGROUND OF THE INVENTION

This invention relates generally to a method of unsticking a material delivery apparatus and more particularly, but not by way of limitation, to a method of changing a material delivery apparatus from a static friction state to a dynamic friction state.

A material delivery apparatus of the type referred to in this disclosure is used to move a material into a mixing unit where the material is mixed with one or more other materials into a mixture. The materials and mixture can be of any type. For example, a sand screw can be used to convey sand, referred to as proppant, into a fracturing fluid made at an oil or gas well.

When a particular amount or rate of material is to be conveyed, the material delivery apparatus is controlled either manually or automatically to obtain the desired delivery of material. At least such automatic control typically includes generating an electric control signal that causes the apparatus to operate as desired. A feedback signal is also typically used to ensure that the actual response of the material delivery apparatus to the control signal is what is desired. Use of a feedback signal creates a closed loop control system.

Although the electric control signal and the feedback signal enable automatic control to be implemented, they can also cause a runaway condition if the material delivery apparatus is stuck at start-up or becomes stuck during operation. That is, if the control signal is trying to drive the apparatus but the feedback signal indicates no operation, the automatic controller can presume that an increase in the control signal is needed. If the control signal is increased and the apparatus then becomes unstuck, the increased control signal will overdrive the apparatus whereby too much material is delivered.

The foregoing has been known to occur in prior automatic control systems with which manual methods of unsticking sand screws have been used. These manual methods include applying a vibrator to the sand screw tube to force the friction between the sand and the screw into a dynamic condition. This helps the screw to turn since the coefficient of dynamic friction is much less than the coefficient of static friction. Another method of manually unsticking a sand screw includes hammering on the tube of the screw. If all else fails, the sand screw hopper will have to be shovelled out.

A shortcoming of such manual methods is that when they are used with an automatic control system, the aforementioned runaway can result. Additionally, manual methods require a human operator to be present at the material delivery apparatus, which might present a dangerous situation. Furthermore, manual methods can be relatively slow, and they can damage the equipment.

A stuck material delivery apparatus also presents the shortcoming of failing to deliver material when it is needed, which can be highly detrimental. For example, if a sand screw is struck so that it does not deliver proppant into a fracturing fluid, and yet the deficient fluid is pumped into a well to create a fracture for enhancing oil or gas recovery, the created fracture may not be adequately propped open whereby it closes when the fracturing pressure is released. If such were to occur, the stuck sand screw would have caused material and money to be wasted because of the inadequate fracturing job. This could also prevent the well from being productive.

In view of these shortcomings, there is the need for an automatic method of unsticking a material delivery apparatus. Such a method should be capable of use with other control methods that automatically control the material delivery apparatus during normal operation so that runaway does not occur when the apparatus is automatically unstuck. Such a method should also be capable of use from and after start-up to ensure that material delivery is not stopped due to the apparatus becoming stuck.

SUMMARY OF THE INVENTION

The present invention overcomes the above-noted and other shortcomings of the prior art by providing a novel and improved method of unsticking a material delivery apparatus. The method can be used with other automatic control methods to prevent runaway when the apparatus is unstuck by the present invention. The method obtains unsticking without operator presence at the apparatus and without operator action (although in the preferred embodiment the operator can manually initiate the automatic unsticking method). The method can be used each time the apparatus is started to ensure "unstuck start-up." The present invention operates quickly so that there is no waiting for someone to go bang on the apparatus. The present invention operates without striking the apparatus with an implement that could damage the apparatus.

The method of unsticking a material delivery apparatus broadly comprises automatically generating and applying to the material delivery apparatus a cyclical drive signal including a first phase during which a first torque is applied to the material delivery apparatus and a second phase during which a second torque is applied to the material delivery apparatus.

The present invention can also be defined as a method of changing a material delivery apparatus from a static friction state to a dynamic friction state, comprising: (a) generating an electrical control signal having a predetermined magnitude selected in response to time; (b) applying, in response to communicating the electrical control signal to the material delivery apparatus, at least two torques to the material delivery apparatus; (c) sensing for operation of the material delivery apparatus; (d) sensing for the lapsing of a predetermined time period; and (e) repeating steps (a) through (d) until operation of the material delivery apparatus is sensed or lapsing of the predetermined time period is sensed.

The present invention can be more particularly defined as an improvement in a method of automatically controlling a sand screw using a generated primary control drive signal. The improvement comprises: incrementing a time counter in response to the lapse of predetermined time increments; monitoring for a primary control drive signal and determining that the primary control drive signal has been generated; determining whether the time counter has counted an elapsed time less than a predetermined time period; monitoring for rotation of the sand screw and determining that rotation has not occurred; computing an unstick drive signal in response to a predetermined relationship between the unstick drive signal and the elapsed time counted by the time counter; and communicating the unstick drive signal to control the sand screw therewith instead of controlling the sand screw with the generated primary control drive signal until determining that rotation of the sand screw has occurred or determining that the time counter has counted an elapsed time not less than the predetermined time period.

Therefore, from the foregoing, it is a general object of the present invention to provide a novel and improved method of unsticking a material delivery apparatus. Other and further objects, features and advantages of the present invention will be readily apparent to those skilled in the art when the following description of the preferred embodiment is read in conjunction with the accompanying drawings.

DETAILED DESCRIPTION OF PREFERRED EMBODIMENT

Incorporated herein by reference are U.S. Pat. application Ser. No 08/084,055 to Stephenson et al , filed Jun. 29, 1993 (attorney docket number HS92.204A1); U.S. Pat. No. 4,916,631 to Crain et al.; U.S. Pat. No. 4,779,186 to Handke et al.; and U.S. Pat. No. 4,751,648 to Sears, III et al. These disclose particular apparatus and methods with which the present invention can be used or implemented, but the present invention is not limited by or to these particular disclosures.

Figure 1:
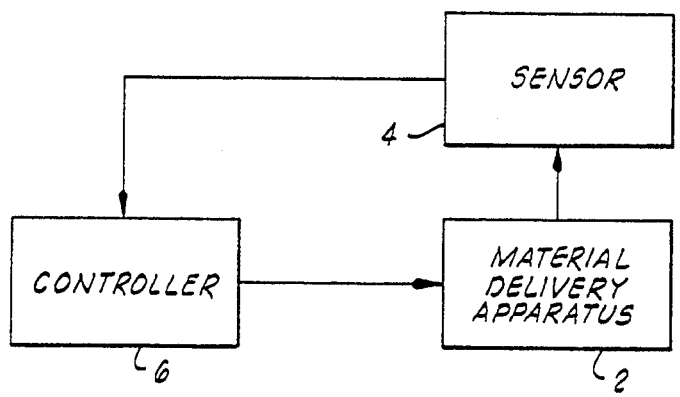
FIG. 1 is a block diagram of a system in which the present invention can be used.

In general, the method of the present invention is useful with a system of the type illustrated in FIG. 1. The general system includes a material delivery apparatus 2 that delivers material at a delivery characteristic (e.g., an operating speed) that can be sensed by a sensor 4. The material delivery apparatus 2 is operated in response to a control signal from a controller 6 that can respond to whether a valid or invalid feedback signal is received from the sensor 4. The system shown in FIG. 1 can be used to deliver liquid, solid or gaseous material.

Although the method of the present invention can be used with the general system shown in FIG. 1, the present invention will be further described with reference to the system shown in FIG. 2. The FIG. 2 system is a particular implementation of the general system shown in FIG. 1.

Figure 2:
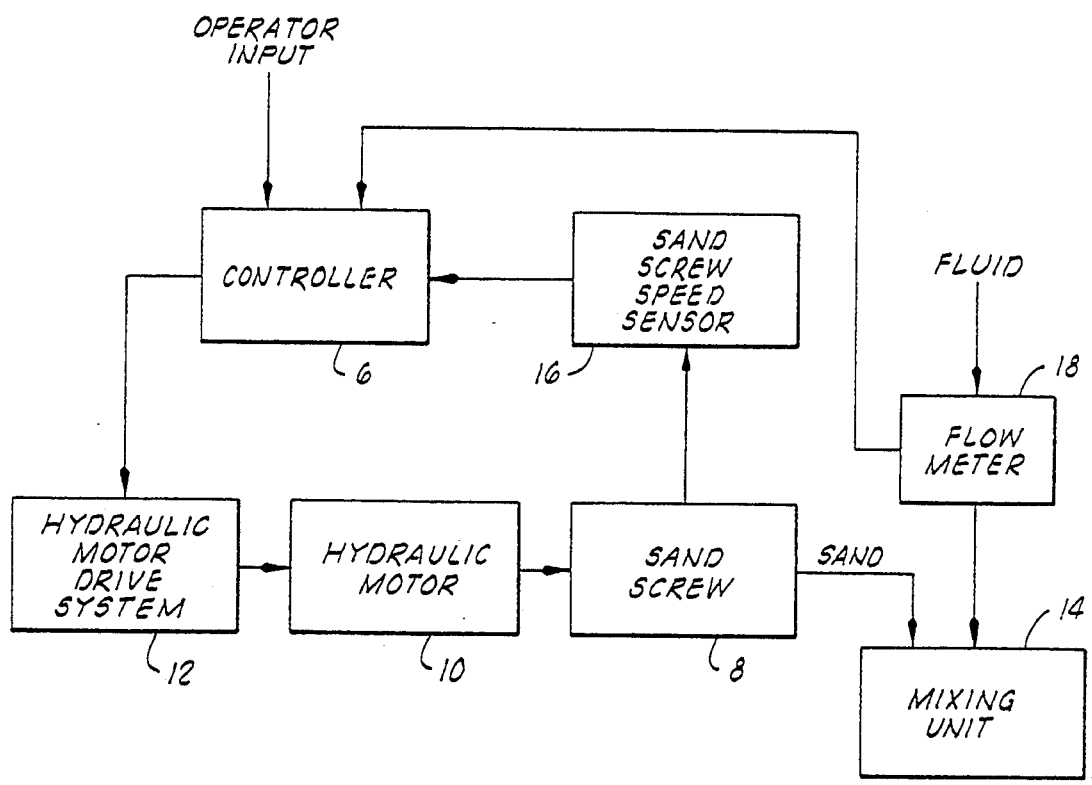
FIG. 2 is a block diagram of a specific implementation of the system shown in FIG. 1.

In the FIG. 2 implementation, the material delivery apparatus 2 includes a sand screw 8 driven by a hydraulic motor 10 that is operated by a hydraulic motor drive system 12. The sand screw 8 is of the type used to deliver sand, referred to as proppant, into a mixing unit 14 for mixing with a fracturing fluid at an oil or gas well site. The hydraulic motor 10 and the hydraulic motor drive system 12 are of conventional types used in such a fracturing fluid mixing system.

The hydraulic motor drive system 12 typically includes a pump that pumps hydraulic fluid to operate the hydraulic motor 10. The pump works in response to a prime mover such as an engine or motor. The hydraulic motor drive system 12 also includes a flow rate control device such as a swash plate within the pump if the pump is a variable displacement pump or an external electro-hydraulic valve, for example, if the pump is a pressure compensated hydraulic pump.

The sand screw 8 has an auger-like screw member that is rotated by the motor 10 to transport sand from an inlet of the sand screw 8 to an outlet communicating with the mixing unit 14. The rate of rotation of this screw element is sensed by a sand screw speed sensor 16. A conventional sensor 16 is typically calibrated to generate an electric signal representing the measured rotational speed of the sand screw 8 in revolutions per minute. An optical encoder is an example of one type of suitable sensor 16.

The signal from the sand screw speed sensor 16 is a feedback signal that is provided to the controller 6. The controller 6 also responds to a signal from a flow meter 18 indicating the flow rate of the fluid into the mixing unit 14. The controller 6 also responds to operator input. In response to such inputs, the controller 6 outputs a primary control signal to the hydraulic motor drive system 12 for controlling the rotational speed of the sand screw 8 and thereby controlling the flow of sand into the mixing unit 14. Through this control, a fracturing fluid with a desired concentration of sand is produced in the mixing unit 14.

The controller 6 can be any suitable type of automated process controller, whether analog or digital, discrete or integrated; however, it preferably includes a multi-tasking digital computer such as a Halliburton Services ARC Unit Controller.

The system described with reference to FIG. 2 is a conventional system used in the oil and gas industry. It is a closed loop system which preferably controls the sand screw 8 in response to the feedback provided by the speed sensor 16; however, it can operate in open loop control also, such as disclosed in the above-cited patent application.

The preferred embodiment of the present invention is implemented through the combination of the conventional equipment and new programming of the controller 6. This programming and the method of the present invention will be described with reference to FIGS. 3 and 4.

Figure 3:
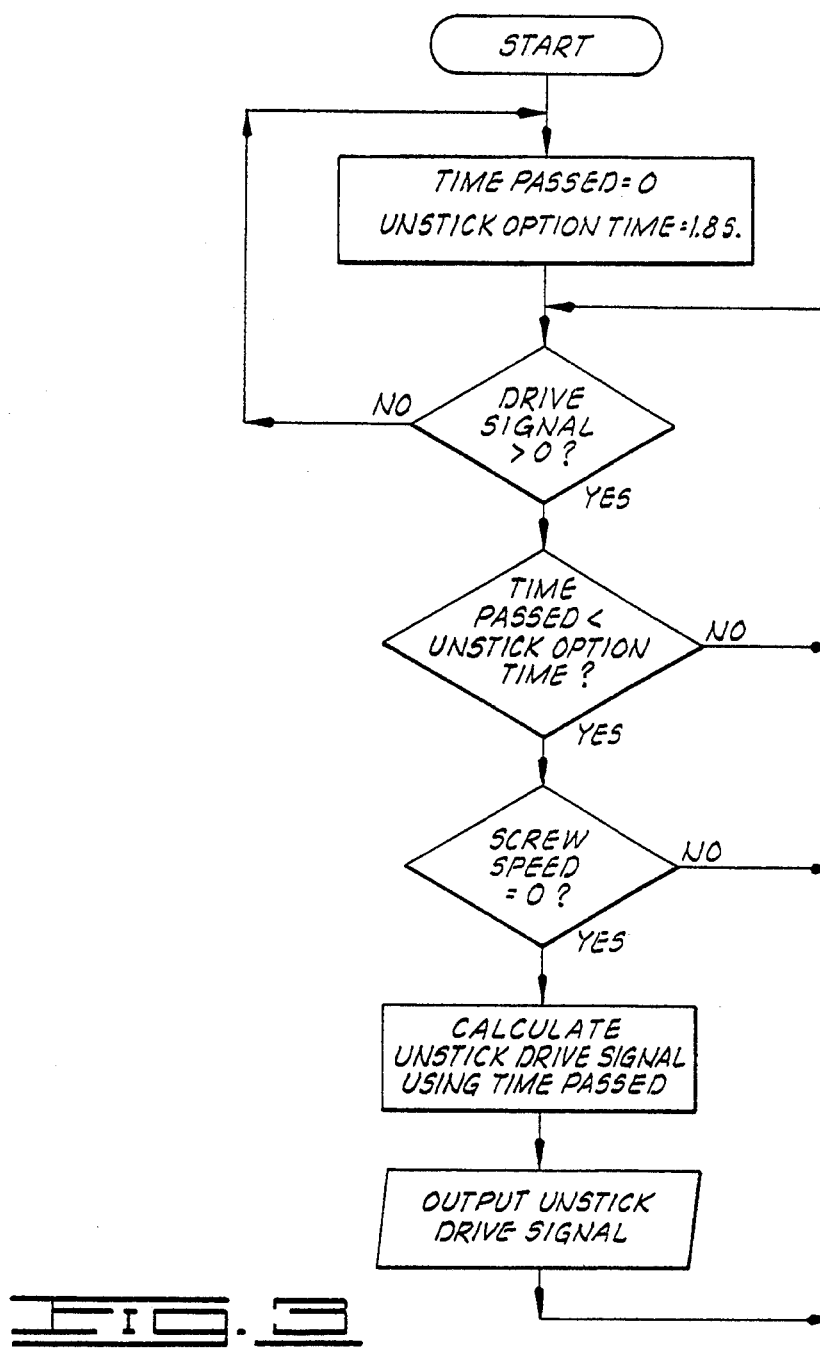
FIG. 3 is a flow chart of a computer program implementing the present invention within the system of FIG. 2.

The method of the present invention as implemented by the equipment programmed in accordance with the flow chart of FIG. 3 generally comprises automatically generating and applying to the material delivery apparatus 2 a cyclical drive signal including a first phase during which a first torque is applied to the material delivery apparatus 2 and a second phase during which a second torque is applied to the apparatus.

The first torque referred to above is preferably maximum torque that can be applied to the material delivery apparatus 2. This maximum torque can, at least in some systems, be generated with a less than maximum control signal. The second torque referred to above is preferably a minimum torque, such as zero torque.

The respective torque is preferably applied for a relatively short time. In the preferred embodiment this short time is defined by the first phase of the drive signal having a first predetermined time period. For example, in a particular implementation, the first predetermined time period is preferably less than one second. The same applies for a second predetermined time period for which the second phase of the drive signal is preferably defined. It is contemplated that the phases of the drive signal can be variably defined, such as based on selected operating conditions (e.g., pump pressure); but in the preferred embodiment described herein the phases are defined for predetermined time periods.

The method of the preferred embodiment repeats the generation and application of the cyclical drive signal until either the appropriate operation of the material delivery apparatus 2 is sensed or a predetermined number of the cyclical signals have been generated and applied.

Specifically referring to FIG. 3 as applied to the sand screw system of FIG. 2, a software implemented time counter is initialized to a starting state. In FIG. 3, this counter is identified as "time passed" which is initially set to zero and then incremented every 0.01 second by a timer routine in a particular implementation. Thus, in the illustrated preferred embodiment, the time counter is incremented in response to the lapse of each 0.01 predetermined time increment.

FIG. 3 also shows that an unstick option time is predetermined within the program. In the preferred embodiment, the option time is predetermined as a selected time period; however, it is contemplated that other predetermining criteria could be used (e.g., an operating condition). An option time of 1.8 seconds is illustrated in FIG. 3. The cycle period of the unstick drive signal is preferably less than the unstick option time so that the option time defines the maximum number of cycles that the method will perform before it stops trying to unstick the sand screw 8. This is the automatic default time period that is used in a particular implementation of the preferred embodiment each time the sand screw is first started. Although not shown in FIG. 3, the program of the particular implementation also includes a time period of 4.2 seconds that is used the first time an operator manually activates this method by appropriately operating the controller 6 (e.g., by toggling between automatic and manual control of the main control program of a specific implementation disclosed in the co-pending patent application referred to above). The method can also be designed so that upon subsequent manual activation by the operator, one or more increased option time periods are established so that more attempts at unsticking the sand screw can be made during any one automatic unstick operation.

The method represented in FIG. 3 further includes monitoring for the primary control drive signal generated by the main control method and determining whether the primary control drive signal has been generated. If this control signal has not been generated (i.e., it is not greater than zero), the method of the present invention continually loops back to reset the "time passed" counter to zero and continue monitoring for the primary control drive signal. When the primary control drive signal is detected, the method of the present invention then determines whether the "time passed" counter contains a count representing a time less than the predetermined unstick option time. If the elapsed time is not less than the option time, the maximum number of cycles to be generated during that particular application of the present invention has occurred and the method loops back to again test for the primary drive signal as shown in FIG. 3. If the unstick option time has not been reached, the method of the present invention monitors for unstuck rotation of the sand screw and determines whether such rotation has occurred. If such rotation has occurred, the method of the present invention loops back to again monitor for the primary drive signal. If the screw speed is zero in the particular embodiment of FIG. 3, thereby indicating that the sand screw is stuck, the method of the present invention computes an unstick drive signal in response to a predetermined relationship between the unstick drive signal and the lapsed time counted by the "time passed" counter. Whether the sand screw speed is zero is determined by sensing the feedback signal provided by the sand screw speed sensor 16.

Figure 4:
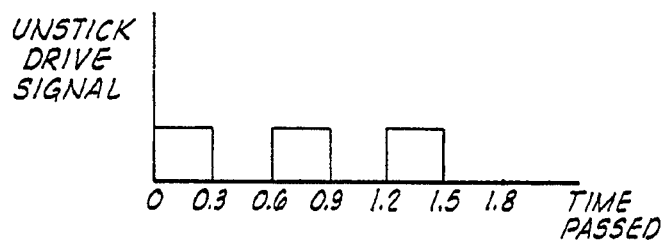
FIG. 4 is a graphical representation of a predetermined relationship between an unstick control signal and an elapsed time of a timing counter used in the control represented in the flow chart of FIG. 3.

The unstick drive signal of the preferred embodiment is an electrical control signal generated by the controller 6 programmed in accordance with FIG. 3. This signal is generated by checking the elapsed time in the "time passed" counter and selecting the output value for the control signal from a predetermined relationship stored in the controller 6. A non-limiting example of such a relationship is illustrated in FIG. 4, which shows that a constant magnitude output is provided anytime during the respective first phase time periods from zero to 0.3 second, 0.6 to 0.9 second and 1.2–1.5 seconds. A zero level output is provided for the respective second phases of each cycle, namely from 0.3–0.6 second, 0.9–1.2 seconds and 1.5–1.8 seconds. This same relationship continues for longer unstuck option times. Other relationships can be used, and other criteria for defining or generating the unstick drive signal can be used.

In the preferred embodiment, the higher magnitude signal provided during the respective first phase of each cyclical drive signal is preferably large enough to cause the sand screw 8 to be driven with maximum torque for the very short duration of the respective first phase. In a particular implementation, this can be done by providing to the hydraulic motor drive system 12 an electrical control signal of between 40 percent and 70 percent of the maximum control signal that could be applied. In one implementation, this unstick drive signal is 50 percent of maximum and operates the swash plate of a variable displacement hydraulic pump to provide sufficient flow rate from the pump to the hydraulic motor 10 whereby the sand screw 8 is driven with maximum torque. During the second phase of a cycle of such unstick drive signal, the swash plate is destroked to reduce the flow rate so that pressure is released and zero torque is applied to the sand screw 8. Comparable control of a pressure compensated hydraulic pump can be obtained by operating the outlet valve disposed between the pump and the hydraulic motor 10. With a pressure compensated pump, the first phase of the unstick drive signal is preferably long enough to open the control valve sufficiently to pressurize the system to the pressure limit of the pump, whereupon maximum torque is applied to the sand screw 8. In response to the second phase of this unstick drive signal, the valve is closed and the pump's pressure control destrokes the pump, sufficient to maintain compensated pressure. Closure of the valve blocks flow to the motor so that zero torque is applied to the sand screw 8.

The unstick drive signal as computed by the controller 6 is output by overwriting the software register normally containing the primary control drive signal that has been generated by a concurrently running control program with which the present invention can be used. Thus, the method of the present invention communicates the unstick drive signal so that it, rather than the primary control drive signal, controls the sand screw during the unstick operation. This continues until it is determined that either rotation of the sand screw has occurred or the "time passed" counter has counted an elapsed time which is not less than the predetermined unstick option time period.

After overwriting/outputting occurs, the method of the present invention loops back to the point of monitoring for the primary control drive signal.

Using the method as just described, the sand screw 8 is automatically hydraulically jarred by the alternate short duration high and low torque applications made during each unstick drive signal cycle. In testing, this method has been used to unstick a sand screw which could not be unstuck with a vibrator or by hammering on the tube of the sand screw.

A program listing including a particular implementation of the flow chart of FIG. 3 is disclosed in the Appendix forming a part of this specification.

It is to be noted that although the aforementioned steps may have been sequentially described in the preferred implementation, multi-processing preferably occurs so that changes can occur at any time. For example, the main control method through which the primary control drive signal is generated is run concurrently with the method of the present invention; and the global values of the unstick drive signal, time passed and screw speed are also concurrently updated.

Thus, the present invention is well adapted to carry out the objects and attain the ends and advantages mentioned above as well as those inherent therein. While a preferred embodiment of the invention has been described for the purpose of this disclosure, changes in the construction and arrangement of parts and the performance of steps can be made by those skilled in the art, which changes are encompassed within the spirit of this invention as defined by the appended claims.

APPENDIX

```
typedef struct
{
        long x[10];
        long y[10];
}struct_x_y;
typedef struct
{
        long out;               /* output*/
        long ffwd;              /* output from curve */
        long sumpi;               /* output from pi portion */
        long max_du;            /* limit change in output*/
        long max_diff;         /* max difference between sumpi and ffwd
*/
        long fdbk_range;       /* allowable range of fdbk */
        long fdbk_threshold;  /* minimum value of fdbk 5 hz */
        struct_x_y curve;
}struct_ffwd_add;

long open_add( short edit_run)
{
        struct_open_add oa;
        struct_pid pid;

switch(edit_run)
        {
        case EDIT_TERMINAL:
             edit_open_add(&oa)
             break;
        case AUTO:
             ff.ffwd = read_curve(&ff);
             ff.sumpi += pid_run(&pid, &error);

/*limit difference between output and curve*/
             if(abs(ff.sumpi) > ff.max_diff_ffwd_sumpi)
                   ff.sumpi = sign(ff.sumpi) * ff.max_diff_ffwd_sumpi /*use sumpi only if feed back is correct */
             if( !check_fdbk (&pid, &ff))
                   sumpi = 0;
             temp_out = ff.ffwd + sumpi;
```

```
              /* limit max change in output */
              if(abs(temp_out - ff.out) > ff.max_du)
                    ff.out = sign( temp_out - ff.out) * ff.max_du;
              else
                    ff.out = temp_out;
              break;
         case INITIALIZE_VARIABLES:

break;
         }

} long check_fdbk(struct_ffwd_add *ff, struct_pid *pid)
{
         temp_diff   =   abs(*global[pid->pv].data.value    -
*global[pid->sp].data.value);
         if(temp_diff > ff->fdbk_range)
         {
              ff->time_bad++;
              if(ff->time_bad > 10)
              {
                    ff->time_bad = 15;
                    return(0);
              }
         }
         else if(*global[pid->pv].data.value < ff->fdbk_threshold)
         {
              ff->time_bad = 15;
              return(0);
         }
         else
         {
              ff->time_bad--;
              if(ff->time_bad < 0)
              {
                    ff->time_bad = 0;
                    return(1);
              }
              return(0);
         }
} long read_curve(long x, struct_x_y *curve)
{
         if(x <= curve->x[0])
              return(curve->y[0]);
         if(x >= curve->x[9])
              return(curve->y[9]);

for(i=1; i<10; i++)
         {
              if(x < curve->x[i])
              {
                    long temp;
                    temp  =  (curve->y[i]  -  curve->y[i-1]) * (x -
curve->x[i-1]);
                    return( temp / (curve->x[i] - curve->x[i-1]) +
curve->y[i-1]);
              }

}
```

}
```
#define where extern
    #include "varable.h"
    #include "\contr\comvar.h"
    #include "constant.h"
#undef where
extern long ffwd_flow_s10;
extern long clean_flow_raw_s10;
/*Function Prototypes for NEWSTUFF.C*/
/*functions allow for accurate placement of cursor*/
/*functions called by display choices for entering data*/
    long enter_pwm(short option, struct_data *ptr);
    long enter_ma(short option, struct_data *ptr);
    long enter_rpm(short option, struct_data *ptr);
    long enter_as_percent (short option, struct_data *ptr);
    long enter_intasfloat_I_min (short option, struct_data *ptr);
    long enter_intasfloat (short option, struct_data *ptr);
    long enter_int (short option, struct_data *ptr);
    long enter_density(short option, struct_data *ptr);
    long enter_spvol (short option, struct_data *ptr);
    long point_value   (short option, struct_data *ptr);
    long return_choice(short option, struct_data *ptr);
    long return_1     (short option, struct_data *ptr);
    long return_0     (short option, struct_data *ptr);
    long add_inuse    (short option, struct_data *ptr);
    long auto_manual  (short option, struct_data *ptr);
    long function_text(short option, struct_data *ptr);
    long loop_text    (short option, struct_data *ptr);
    long display_choices(short option, short start, short end,
struct_com enter[]);
    long display_globals(short option, short start, short end,
                                        struct_com enter[]);
    long display_loop();
    long change_globals();
    long change_globals_master();
    long misc_vars();
    long sign(long num);
    long psuedo_noise(long t);

long display_function(short loop_num);

/****************************************************************
 * control functions
 ****************************************************************/
    long pid1(short edit0_run1);
    long pid2(short edit0_run1);
    long nop(short edit0_run1);
    extern struct_com global[];

/****************************************************************
 * probability_filter - returns filtered signal
 * 2/21/91
 ****************************************************************/
short prob_s7[30] = {2,9,19,29,39,48,58,65,73,81,87, 92,97,102,106,110,114,116,118,120,121,122, 123,124,125,125,126,126,127,127};
long probabilty_filter (long raw, long filt, long stdev, long
*delta_partial_s7)
```

```
{
    int t, delta_s7;
    if(stdev <=0) return(raw);

delta_s7 = (raw - filt) *128;
    t = delta_s7 / (128 * stdev);
    if ( t < 0)
        t = -t;
    if ( t > 29 )
        t = 29;
    *delta_partial_s7 += (prob_s7[t] * delta_s7)/128;
    filt += (*delta_partial_s7 / 128);
    *delta_partial_s7 %= 128;
    return ( filt);
}

/**************************************************************
 * definitions of control_functions
 **************************************************************/
long nop(short edit0_run1)
{
    /*nop does nothing*/
    return(1);
}
/**************************************************************
 * set_globalpid_equal_localpid -
 *    routine sets the global pid parameters equal to the
 *    local pid parameters
 * 5/28/92
 **************************************************************/
int set_globalpid_equal_localpid(short num, struct_pid *pid)
{
    integral_gain[num]    = (float) pid->I / (60.0 * 1000.0);
    proportional_band[num] = (float) pid->P / 1000.0;
    control_zone_div2[num] = (int) pid->dead_band;
    lower_limit[num]       = (int) pid->lowwer_lim * 100;
}
/**************************************************************
 * set_localpid_equal_globalpid -
 *    routine sets the pid parameters equal to the
 *    global pid parameters
 * 5/28/92
 **************************************************************/
int set_localpid_equal_globalpid(short num, struct_pid *pid)
{
    pid->I = (long) (integral_gain[num] * 60 * 1000);
    pid->P = (long) (proportional_band[num]) * 1000;
    pid->dead_band = (long) control_zone_div2[num];
    pid->lowwer_lim = (long) lower_limit[num] / 100;
}

/**************************************************************
 * pid_data_check () - routine is called in EDIT_OFF
 *   option.
 * 5/27/92
 **************************************************************/
long pid_data_check (struct_pid *pid)
{
    /*check variables that point at globals to be sure
      values are > 0 and less than global_num-1 */
    if(pid->sp < 1 || pid->sp >= global_num-1)
        return(INITIALIZE_VARIABLES);  /*return(5) */
```

```
    if(pid->pv < 1 || pid->pv >= global_num-1)
        return(INITIALIZE_VARIABLES);  /*return(5) */
    if(pid->cv_1 < 1 || pid->cv_1 >= global_num-1)
        return(INITIALIZE_VARIABLES);  /*return(5) */
    if(pid->cv_2 < 1 || pid->cv_2 >= global_num-1)
        return(INITIALIZE_VARIABLES);  /*return(5) */

/*check lowwer limits of p and i */
    if(pid->P < 0 || pid->I < 0 || pid->dead_band < 0 ||
        pid->stdev_pv < 0    || pid->max_du < 0)
        return(INITIALIZE_VARIABLES);  /*return(5) */
    if(pid->offset_pos < 0 || pid->offset_neg < 0)
        return(INITIALIZE_VARIABLES);  /*return(5) */
    if(pid->accum_diff  !=  ACCUMULATIVE  &&  pid->accum_diff
!=DIFFERENCE)
        return(INITIALIZE_VARIABLES);  /*return(5) */
    if(pid->inverse_control != -1 && pid->inverse_control != 1)
        return(INITIALIZE_VARIABLES);  /*return(5) */ return(1);
}

/***********************************************************
 * pid_adjust - adjusts PB to attain the desired response
 *     rate of the controller.
 * 2/24/92
 ***********************************************************/
long pid_adjust(struct_pid *pid, struct_error *error)
{
    int abs_change_error, change_time, td;

if(pid->sp_old != *global[pid->sp].data.value)
    {
        pid->err1 = error->err;
        pid->t1 = time/10;
        pid->sp_old = *global[pid->sp].data.value;
        return(0);
    }
    abs_change_error = abs(pid->err1 - error->err);
    if(abs_change_error >  pid->minerr && (abs(error->err) <
abs(pid->err1)/10
        || sign(error->err) != sign(pid->err1)))
    {
        change_time = (int) ((long) time/10 - pid->t1); /*make 1
= 0.1s*/
        td = max(pid->I/100 + pid->time_offset, 1);
        if(change_time < max(0, (td - pid->time_range)) )
        {
            if(pid->P < 100000)
                pid->P =(pid->P * min(1000 + (pid->gper/10*(td-
pid->time_range - change_time))/td,
                        1000 + pid->gper/10))/1000;
            else
                pid->P   =(pid->P/10*   min(1000    +
(pid->gper/10*(td- pid->time_range - change_time))/td,
                        1000 + pid->gper/10))/100;

}
        if(change_time > (td + pid->time_range))
        {
```

```
                if(pid->P < 100000)
                        pid->P    =    (pid->P   *    max(1000   -
(pid->gper/10*(-td- pid->time_range + change_time))/td,
                        1000 - pid->gper/10))/1000;
                else
                        pid->P    =    (pid->P/10*    max(1000   -
(pid->gper/10*(-td- pid->time_range + change_time))/td,
                        1000 - pid->gper/10))/100;
        }
        pid->err1 = error->err;
        pid->t1   = time/10;
    }
    if(abs(error->err) > abs(pid->err1) || sign(error->err) !=
sign(pid->err1))
        {
        pid->err1 = error->err;
        pid->t1   = time/10;
    }
    if(pid->gper) /*limit range of pid->P */
        {
        pid->PB_min = max(pid->PB_min, 1);
        pid->P = max(pid->P, pid->PB_min);
        pid->P = min(pid->P, pid->PB_min*25);
    }
    return(0);
}
/***********************************************************
 * pid_edit - function for editing pid? parameters
 *  2/25/92
 ***********************************************************/
long pid_edit(struct_pid *pid)
{
    short temp_pv, temp_cv_1;
    struct_com enter[]=
            {1, 2, 0,0,  "Set pt  ",point_value,
             1, 3, 0,0,  "Pro. V  ",point_value,
             1, 4, 0,0,  "PV (Normalized) ",enter_as_percent,
             1, 5, 0,0,  "CV1 pos ",point_value,
             1, 6, 0,0,  "CV2 neg ",point_value,
             1, 7, 0,0,  "Proportional Band",enter_intasfloat,
             1, 8,  0,0,         "Integral    Term
",enter_intasfloat_I_min,
             1, 9, 0,0,  "Derivative       ",enter_as_percent,
             1, 10,0,0,  "Dead Band        ",enter_as_percent,
             40,2, 0,0,  "Max Diff Extra V ",enter_as_percent,
             40, 3, 0,0, "Stdev PV (0 OFF) ",enter_as_percent,
             40, 4, 0,0, "Offset CV (pos)  ",enter_as_percent,
             40, 5, 0,0, "Offset CV (neg)  ",enter_as_percent,
             40, 6, 0,0, "Max Change in CV ",enter_as_percent,
             40, 7, 0,0, "Lower Limit of CV",enter_as_percent,
             40, 8, 0,0, "Upper Limit of CV",enter_as_percent,
             40, 9, 0,0, "0=Diff  1=Accum  ",enter_int,
             40,10, 0,0, "Inverse (-1 or 1)",enter_int,
             1,15, 0, 0, "Per Change PB (%)",enter_as_percent,
             1,16, 0, 0, "Min Error (%)    ",enter_as_percent,
             1,17, 0, 0, "Minimum PB       ",enter_intasfloat,
             1,18, 0, 0,"Extra Var",point_value,
             40,15, 0, 0,"Time Offset  sx100",enter_int,
             40,16, 0, 0,"Range of Time sx100",enter_int,
             1,21, 0, 0, "pid->err1 ", enter_as_percent,
             1,22, 0, 0, "pid->err1 ", enter_int,
             1,23, 0, 0, "pid->minerr", enter_int,
```

```
              25, 1, 0,0,"PID LOOP PARAMETERS", return_1,
              10,14, 0,0,"ADAPTIVE PORTION (Set Percent Change PB
0 to TURN OFF)",return_1
              };

enter[0].data.value  = &pid->sp;
     enter[1].data.value  = &pid->pv;
     enter[2].data.value  = &pid->filter_pv;
     enter[3].data.value  = &pid->cv_1;
     enter[4].data.value  = &pid->cv_2;
     enter[5].data.value  = &pid->P;
     enter[6].data.value  = &pid->I;
     enter[7].data.value  = &pid->D;
     enter[8].data.value  = &pid->dead_band;
     enter[9].data.value  = &pid->max_diff_sp;
     enter[10].data.value = &pid->stdev_pv;   /*max process var*/
     enter[11].data.value = &pid->offset_pos;
     enter[12].data.value = &pid->offset_neg;
     enter[13].data.value = &pid->max_du;
     enter[14].data.value = &pid->lowwer_lim;
     enter[15].data.value = &pid->upper_lim;
     enter[16].data.value = &pid->accum_diff;
     enter[17].data.value = &pid->inverse_control;
     enter[18].data.value = &pid->gper;    /*1000 = 10% change*/
     enter[19].data.value = &pid->minerr;  /*% same as error*/
     enter[20].data.value = &pid->PB_min;
     enter[21].data.value = &pid->extra_var;
     enter[22].data.value = &pid->time_offset;
     enter[23].data.value = &pid->time_range;
     enter[24].data.value = &pid->err1;
     enter[25].data.value = &pid->err1;
     enter[26].data.value = &pid->minerr;

display_choices(CLEAR_BUILD, 0, 29, enter);
     /**check and make sure values are being applied to right
vars*/
     return(1);
}
/************************************************************
 * pid_run - calculation portion of pid controller.
 *    1. PV can be filtered
 *    2. PV can be normalized (after being filtered)
 *    2/24/92
 ************************************************************/
#define INV_DT = 10   /*inverse of 0.1*/
long pid_run(struct_pid *pid, struct_error *error)
{
     long temp_var;
     long PB;

temp_var = *global[pid->pv].data.value;

/*normalize process variable*/
     if(global[pid->pv].data.max_value > 1)
     {
          if(temp_var < 20000)
               temp_var = min(10000, (10000 * temp_var)/global[pid->pv].data.max_value);
          else
               temp_var = min(10000, ((1000 * temp_var)/global[pid->pv].data.max_value)*10);
```

```
}
    pid->filter_pv = probabilty_filter ( temp_var,
        pid->filter_pv, pid->stdev_pv, &pid->delta_partial_s7);

/* normalize setpoint 0-10000 making units same as pv*/
    temp_var = *global[pid->sp].data.value;
    if(temp_var < 20000 && global[pid->sp].data.max_value)
            temp_var   =   min(10000,   (10000   *   temp_var)/
global[pid->sp].data.max_value);
        else if(global[pid->sp].data.max_value)
            temp_var   =   min(10000,   ((1000   *   temp_var)/
global[pid->sp].data.max_value)*10);

error->err = (temp_var - pid->filter_pv);

error->ve  = error->err - error->err_old;

/*check bottom limit of P and I*/
    pid->P = max(1 , pid->P);
    pid->I = max(1 , pid->I);
    pid->D = max(0 , pid->D);

/* 1000 * 1000 * err * 0.1    + ve * 1000 +
100 + */
                        /* Derivative  *  time  difference  *
acceleration */
    temp_var = (100000 * error->err) / pid->I + error->ve * 1000
+
                pid->D * (error->ve - error->ve_old) * 10;

if(abs(temp_var) < 10000)
    {
        temp_var        = (100000 * temp_var) / pid->P;
        temp_var        += pid->partial_du;
        pid->partial_du= temp_var % 1000;
        temp_var        /= 1000;
    }
    else if(abs(temp_var) < 100000)
    {
        temp_var        = (10000 * temp_var) / pid->P;
        temp_var        += pid->partial_du;
        pid->partial_du = temp_var % 100;
        temp_var        /= 100;   /*1000/10*/
    }
    else if(abs(temp_var) < 1000000)
    {
        temp_var        = (1000 * temp_var)/ pid->P;
        temp_var        += pid->partial_du;
        pid->partial_du = temp_var % 10;
        temp_var        /= 10;
    }
    else
        temp_var = (100*temp_var) / pid->P;

/*once code comes inside Dead Band 5 secs must pass before
      the output is zeroed.  This allows the PV to settle*/
    if(abs(error->err) < pid->dead_band)
    {
        if(pid->time_dead_band++ > 50)        /* 50 = 5 secs*/
        {
            temp_var = 0;
            pid->time_dead_band = 60;
        }
```

```
        }
        else
                pid->time_dead_band = 0;

/**Limit Maximum Difference between control var and extra
variable
           by not increasing or decreasing CV if diff > max_diff**/
        if(pid->max_diff_sp)
        {
                long diff;
                diff     =     *global[pid->cv_1].data.value   -
*global[pid->extra_var].data.value;
                if(diff > pid->max_diff_sp && temp_var > 0)
                        temp_var = 1;
                if(diff < -pid->max_diff_sp && temp_var < 0)
                        temp_var = -1;

} temp_var *= pid->inverse_control;  /*neg to positive*/
        error->err_old = error->err;
        error->ve_old  = error->ve;
        return(temp_var);
}
/************************************************************
 * pid_auto()
 *   2/27/92
 ************************************************************/
long pid_auto(long control_out, struct_pid *pid)
{
        long scale_cv_1, divide_cv_1, round_cv_1;
        if(abs(control_out) > pid->max_du)    /*check for maximum
output*/
                control_out = sign(control_out) * pid->max_du;

/**reduce scale to keep from over running variable*/
        if( global[pid->cv_1].data.max_value > 100000)
        {
                scale_cv_1 = global[pid->cv_1].data.max_value/10;
                divide_cv_1= 1000;
                round_cv_1 = 500;
        }
        else
        {
                scale_cv_1  = global[pid->cv_1].data.max_value;
                divide_cv_1 = 10000;
                round_cv_1 = 5000;
        } switch(pid->accum_diff)
        {
        case DIFFERENCE:
                if(control_out > 0)
                {
                        *global[pid->cv_2].data.value = 0;
                        *global[pid->cv_1].data.value   =
((control_out+pid->offset_pos)*
                                scale_cv_1 + round_cv_1 )/ divide_cv_1;
                }
                if(control_out < 0)
                {
```

```
                *global[pid->cv_1].data.value = 0;
                *global[pid->cv_2].data.value =    ((-control_out
+pid->offset_neg)*
                    scale_cv_1 + round_cv_1) / divide_cv_1;
            }
            if(control_out == 0)
            {
                *global[pid->cv_1].data.value = (pid->lowwer_lim *
scale_cv_1)/divide_cv_1;
                *global[pid->cv_2].data.value = (pid->lowwer_lim *
scale_cv_1)/divide_cv_1;
            }
            break;
        case ACCUMULATIVE:
            {
            long low_lim, upper_lim;
            if(control_out > 0)
                control_out += pid->offset_pos;
            else if(control_out < 0)
                control_out -= pid->offset_neg;

if(control_out < 0)
                round_cv_1 = -round_cv_1;  /*remove round off*/
            *global[pid->cv_1].data.value += (( control_out *
                            scale_cv_1   +   round_cv_1)      /
divide_cv_1);
            low_lim   = (pid->lowwer_lim * scale_cv_1)/divide_cv_1;
            upper_lim = (pid->upper_lim  * scale_cv_1)/divide_cv_1;
            *global[pid->cv_1].data.value = max(low_lim,
*global[pid->cv_1].data.value);
            *global[pid->cv_1].data.value = min(upper_lim,
*global[pid->cv_1].data.value);
            /*put value in both control_outs because they are there*/
                * g l o b a l [ p i d - > c v _ 2 ] . d a t a . v a l u e   =
*global[pid->cv_1].data.value;
            }
            break;
    }
    return(1);

}
/*************************************************************
 * pid1 - general pid routine
 *  2/27/92
 *************************************************************/
long pid1(short edit0_run1)
{
    static struct_pid   pid ;
    static struct_error error;
    static short auto_count, edit_on;

switch(edit0_run1)
    {
    case EDIT_TERMINAL: /*edit pid parameters*/
        edit_on = 99;
        pid_edit(&pid);
        edit_on = 0;
        break;
    case AUTO:       /*run pid */
        if(auto_count)
        {
```

```
                    long temp_tl;
                    temp_tl = pid_run(&pid, &error);
                    pid_auto(temp_tl, &pid);
                    pid_adjust(&pid, &error);
                }
                else
                {
                    pid_run(&pid, &error);
                    auto_count = 1;
                }
                break;
        case MANUAL:   /*backup parameters*/
                if(auto_count && pid.accum_diff==DIFFERENCE)
                {
                    *global[pid.cv_1].data.value = 0;
                    *global[pid.cv_2].data.value = 0;
                }
                auto_count=0;
                break;
        case INITIALIZE_VARIABLES:
                edit_on = 0;
                auto_count=0;
                pid.filter_pv = 10000000;
                pid.delta_partial_s7 = 0;
                pid.partial_du = 0;
                pid.err1 = pid.t1 = pid.count = 0;
                pid.extra_var = 5; /*adj_flow_count[4]*/
                pid.sp    = 3;   /*set_point[1]*/
                pid.cv_1 = 1;   /*output[1]*/
                pid.cv_2 = 1;
                pid.pv    = 5;   /*adj_flow_count[4]*/
                pid.accum_diff = 1;
                pid.inverse_control=1;
                pid.P = 200000; /*200*/
                pid.I = 30000;   /*0.5 min*/
                pid.D = 0;
                pid.dead_band = 0;                    pid.stdev_pv = 0;
                pid.offset_pos=0;                     pid.offset_neg=0;
                pid.max_du = 2000;  /*20%*/
                pid.max_diff_sp = 500; /*5 bbl/min max diff between extra
and cv*/
                pid.lowwer_lim = 0;
                pid.upper_lim = 10000;  /*limit CV to 100%*/
                pid.time_offset = 0;
                pid.time_range = 0;
                pid.gper = 0;
                pid.minerr = 2000;
                pid.time_dead_band = 0;
                pid.PB_min = pid.P;

case EDIT_OFF:  /*retrieve backed up parameters*/
                edit_on = 0;
                auto_count=0;
                return(pid_data_check(&pid));
                break;
        } return(0);
}
```

```
/************OPEN ADD STUFF BELOW*********************/
/****************************************************
 * open_add_edit_1 - edit parameters of ffwd terms
 * 6/1/92
 ****************************************************/
long open_add_edit_1(struct_open_add *oa, struct_pid *pid)
{
    short i;
    struct_com enter[]=
         {1,   2,   0,0,"Max    Difference   of   PI
",enter_as_percent,
          1,   3,   0,0,"Feed Back Range (RPM)    ",enter_rpm,
          1,   4,   0,0,"Feed Back Threshold (RPM) ",enter_rpm,
          1,   5,   0,0,"Minimum   output
",enter_as_percent,
          1,   6,   0,0,"Low    Correction    (0    to    5%)
",enter_as_percent,
          1,   7,   0,0,"High   Correction    (0    to    5%)
",enter_as_percent,
          1,10,   0,0,"ON Unstick Counts  10 = 1s",enter_int,
          1,11,   0,0,"OFF Unstick Counts 10 = 1s",enter_int,
          1,12,   0,0,"Output    for    Unstick
",enter_as_percent,
          10,13,   0,0,"PARAMETERS    FOR    UNSTICKING
SCREW",return_1,
          10,1, 0,0,"OPEN LOOP PI SCREEN",return_1
         };
    enter[0].data.value = &oa->max_diff;
    enter[1].data.value = &oa->fdbk_range;
    enter[2].data.value = &oa->fdbk_threshold;
    enter[3].data.value = &pid->lowwer_lim;
    enter[4].data.value = &oa->out_cor_low;
    enter[5].data.value = &oa->out_cor_high;
    enter[6].data.value = &oa->unstick_on;
    enter[7].data.value = &oa->unstick_off;
    enter[8].data.value= &oa->unstick_out;

display_choices(CLEAR_BUILD, 0, 11, enter);

return(1);
}
/****************************************************
 * open_add_edit_2 - edit parameters of ffwd terms
 * 6/1/92
 ****************************************************/
long open_add_edit_2(struct_open_add *oa, struct_pid *pid, int
screw_index)
{
    short i;
    struct_com enter[]=
         {
          10,  2,   0,0,"Maximum   current   Output    for    (4-20
ma)",enter_ma,
          10,  4,   0,0,"X0 ",enter_rpm,
          40,4,   0,0,"Y0 ",enter_as_percent,
          10,  5,   0,0,"X1 ",enter_rpm,
          40,5,   0,0,"Y1 ",enter_as_percent,
          10,  6,   0,0,"X2 ",enter_rpm,
          40,6,   0,0,"Y2 ",enter_as_percent,
          10,  7,   0,0,"X3 ",enter_rpm,
          40,7,   0,0,"Y3 ",enter_as_percent,
          10,  8,   0,0,"X4 ",enter_rpm,
```

```c
                    40,8,  0,0,"Y4 ",enter_as_percent,
                    10, 9,  0,0,"X5 ",enter_rpm,
                    40,9,  0,0,"Y5 ",enter_as_percent,
                    10, 10, 0,0,"X6 ",enter_rpm,
                    40,10, 0,0,"Y6 ",enter_as_percent,
                    10, 11, 0,0,"X7 ",enter_rpm,
                    40,11, 0,0,"Y7 ",enter_as_percent,
                    10, 12, 0,0,"X8 ",enter_rpm,
                    40,12, 0,0,"Y8 ",enter_as_percent,
                    10, 13, 0,0,"X9 ",enter_rpm,
                    40,13, 0,0,"Y9 ",enter_as_percent,
                    10, 16, 0,0,"Cal Time (100 = 1 sec)",enter_int,
                    10, 17, 0,0,"Maximum Low RPM (380)",enter_rpm,
                    10, 18, 0,0,"Low RPM  (3)  ",enter_rpm,
                    10, 19, 0,0,"High RPM (10)  ",enter_rpm,
                    25, 1, 0,0," Current Calibration Curve ",return_1,
                    };

enter[0].data.value = &max_analog[screw_index];
        for(i=0;i<10;i++)
        {
                enter[1+2*i].data.value = &oa->curve.x[i];
                enter[2+2*i].data.value = &oa->curve.y[i];
        }
        enter[21].data.value = &oa->cal_time;
        enter[22].data.value = &oa->max_low_hz;
        enter[23].data.value = &oa->low_hz;
        enter[24].data.value = &oa->high_hz;

display_choices(CLEAR_BUILD, 0, 26, enter);

return(1);
}
/************************************************************
 * spin - gives the user something to look at during
 *      calibration
 * 6/17/92
 ************************************************************/
int spin(long wait_time)
{
        int count, i;
        unsigned int time_rec;
        time_rec = time;
        count = 0;
        while(time < time_rec + wait_time)
        {
                clear_old_message();
                for(i=0;i<60;i++)
                {
                        if(ascii_message())
                        {
                                if(ascii_in[0] = 'q');
                                        return(0);
                        }
                }
                if(count++ > 3)
                        count = 0;
                switch(count)
                {
                case 0:
                        print_at(1,1,"\\");
                        break;
```

```
            case 1:
                    print_at(1,1,"|");
                    break;
            case 2:
                    print_at(1,1,"/");
                    break;
            case 3:
                    print_at(1,1,"-");
                    break;
            }
    }
    print_at(1,1,"-");
    return(1);
}
/***********************************************************
 * auto_cal_screw
 * 6/17/92
 ***********************************************************/
int auto_cal_screw(int screw_index, struct_open_add *oa, struct_pid
*pid)
{
    int i, count, max_rpm_x10, old_max_analog, temp_max;
    struct_x_y cal;
    int step[]={50000,20000,5000,1000,100,100,100};
    char buf[80];
    old_max_analog = max_analog[screw_index];

max_rpm_x10 = -1;
    clear_the_screen();
    clear_the_screen();
    print_at(15,5, " Calibrate Screw Manual or Auto (M/A)");
    if(read_term_return_choice () == QUIT)
            return(0);
    if(ascii_in[0] == 'M' || ascii_in[0] == 'm')
    {
            open_add_edit_2(oa,pid,screw_index);
            return(0);
    }
    print_at(13,5, "                                          ");

print_at(15,1, "AUTO CALIBRATION PROCEDURE FOR SAND SCREW");
    print_at(15,2, "         Enter a <q> to Abort ");
    print_at(15,5, " Press Enter to Continue ");
    if(read_term_return_choice () == QUIT)
            return(0);
    print_at(13,5, "                                          ");

if(!manual[screw_index])
    {
            print_at(8,5, "Place Screw in Manual (press enter to continue)");
            read_term_return_choice ();
            print_at(8,5, "                                                ");
            if(!manual[screw_index])
                    return(0);
    }

/*set maximum output for screw*/
    print_at(8,5, " Finding Max Current - Max RPM Point ");
    *global[pid->cv_1].data.value = 1000000;  /*start at 100%*/
    max_analog[screw_index] = 2700;
    spin(oa->cal_time);     /*set at max to give screw more time to
```

```
get to speed*/
      spin(oa->cal_time);    /*set at max to give screw more time to
get to speed*/
      if(*global[pid->pv].data.value < 10)
      {
            print_at(8,5, "Calibration Failed: No Feed Back from
Sensor");
            *global[pid->cv_1].data.value = 0;
            max_analog[screw_index] = old_max_analog;
            read_term_return_choice ();
            return(0);
      } temp_max = 2792;   /*set at 15 ma*/
      for(i=0;i < 8;i++)
      {
            max_analog[screw_index] = 2792 + i * 186;   /*increase by
1 ma*/
            if(max_analog[screw_index] > 4050)
                  max_analog[screw_index] = 4095;

if(!spin(oa->cal_time))
            {
                  *global[pid->cv_1].data.value = 0;
                  max_analog[screw_index] = old_max_analog;
                  return(0);
            }
            if(*global[pid->pv].data.value > max_rpm_x10 )
            {
                  temp_max   = max_analog[screw_index];
                  max_rpm_x10 = *global[pid->pv].data.value;
                  sprintf(buf,"Maximum    RPM   =    %5.1f   ",(float)
max_rpm_x10 / 10.0);
                  print_at(20,  8,buf);
                  sprintf(buf,"Maximum OUT = %5.1f   (%4.1f ma) ",
                              (float) pid->upper_lim / 100.0,
                                        ( f l o a t )
(max_analog[screw_index] * 22) / 4095);
                  print_at(20,  9,buf);
            }
            /*move on if rpm is no longer increasing with inc. in
output*/
            if(max_analog[screw_index] > temp_max + 10)
                  i = 8;
      }
      /* fine tune max if less than full output of 22 ma */
      if(temp_max < 4050)
      {
            max_analog[screw_index] = temp_max - 130;
            max_rpm_x10 = -1; /*set max low to restart hunt*/
            for(i=0;i<24;i++)
            {
                  max_analog[screw_index] += 10;   /*increase by 0.05
ma*/

/*jump out of routine after max's are passed over
                     (peak has been found) */
                  if(max_analog[screw_index] > (temp_max + 30))
                        i = 25;

if(!spin(oa->cal_time))
                  {
                        *global[pid->cv_1].data.value = 0;
```

```
                max_analog[screw_index] = old_max_analog;
                return(0);
        }
        if(*global[pid->pv].data.value > max_rpm_x10 )
        {
                temp_max = max_analog[screw_index];
                max_rpm_x10 = *global[pid->pv].data.value;
                sprintf(buf,"Maximum  RPM  =  %5.1f  ",(float) max_rpm_x10 / 10.0);
                print_at(20,  8,buf);
                sprintf(buf,"Maximum OUT = %5.1f  (%4.1f ma) ",
                                       (float) pid->upper_lim / 100.0,
                                             (  f   l   o a   t   )
(max_analog[screw_index] * 22) / 4095);
                print_at(20,   9,buf);
        }
      }
    }
    if(temp_max > 4040)
          temp_max = 4095;   /*close enough to 22 ma*/
    max_analog[screw_index] = temp_max;

if(max_rpm_x10 < oa->max_low_hz)
    {
          sprintf(buf, "Suggested minimum RPM at maximum Output = %5.1f",
                                        (float) oa->max_low_hz / 10.0);
          print_at(8,5, buf);
          print_at(8,6, "Check Engine to be sure that it is at Full Throttle");
          print_at(8,7, "!!! Do you wish to continue Calibration (Y/N):");
          read_term_return_choice ();
          if(ascii_in[0] != 'Y' && ascii_in[0] != 'y')
          {
                *global[pid->cv_1].data.value = 0;
                max_analog[screw_index] = old_max_analog;
                return(0);
          }
          print_at(8,5, "
");
          print_at(8,6, "
");
          print_at(8,7, "
");
          *global[pid->cv_1].data.value = pid->upper_lim * 100;
          spin(oa->cal_time);
          max_rpm_x10 = *global[pid->pv].data.value;
          sprintf(buf,"Maximum RPM = %5.1f ",(float) max_rpm_x10 / 10.0);
          print_at(20,  8,buf);

}
    /* set low point */
    print_at(8,5, "Finding low point for Drive - RPM Curve
          ");
    *global[pid->cv_1].data.value = 300000;   /*start at 30 %*/
    for(i=0;i<5;i++)
    {
          count=0;
          while(*global[pid->pv].data.value  >  oa->high_hz   ||
```

```
count++ > 20)
        {
                *global[pid->cv_1].data.value -= step[i];
                if(*global[pid->cv_1].data.value < 0)
                {
                        *global[pid->cv_1].data.value = 0;
                        print_at(8,5, "Calibration Failed:  Output LOW
");
                        read_term_return_choice ();
                        max_analog[screw_index] = old_max_analog;
                        return(0);
                }
                if(!spin(oa->cal_time))
                {
                        *global[pid->cv_1].data.value = 0;
                        max_analog[screw_index] = old_max_analog;
                        return(0);
                }
        }
        i++;
        count=0;
        while(*global[pid->pv].data.value < oa->low_hz || count++
> 20)
        {
                *global[pid->cv_1].data.value += step[i];
                if(*global[pid->cv_1].data.value > 300000)
                {
                        *global[pid->cv_1].data.value = 0;
                        print_at(8,5, "Calibration Failed:  Output HIGH
");
                        read_term_return_choice ();
                        max_analog[screw_index] = old_max_analog;
                        return(0);
                }
                if(!spin(oa->cal_time))
                {
                        *global[pid->cv_1].data.value = 0;
                        max_analog[screw_index] = old_max_analog;
                        return(0);
                }
        }
}
if(*global[pid->pv].data.value < oa->low_hz &&
        *global[pid->pv].data.value > oa->high_hz)
{
        print_at(8,5,"Calibration Failed: Unable to establish low
point ");
        *global[pid->cv_1].data.value = 0;
        read_term_return_choice ();
        max_analog[screw_index] = old_max_analog;
        return(0);
}
cal.y[0] = *global[pid->cv_1].data.value/100;
cal.y[9] = pid->upper_lim;
for(i=1;i<9;i++)
        cal.y[i] = (i * (cal.y[9]-cal.y[0]))/9 + cal.y[0];

print_at(8,5, "Calculating Points for Curve                 ");
print_at(5,  11,"             New CAL                      Old
CAL   ");
print_at(5,  12,"        RPM        OUTPUT            RPM
```

OUTPUT");
    print_at (5, 13,"_____
_");

```
    for(i=0;i<10;i++)
    {
        *global[pid->cv_1].data.value = cal.y[i] * 100;
        if(!spin(oa->cal_time))
        {
            *global[pid->cv_1].data.value = 0;
            max_analog[screw_index] = old_max_analog;
            return(0);
        }
        cal.x[i] = *global[pid->pv].data.value;
        sprintf(buf, "%3d.   %5.1f    %5.1f%% (%4.1f ma)   %5.1f    %5.1f%% (%4.1f ma)",i,
            (float) cal.x[i]/10.0  ,(float) cal.y[i] / 100.0,
            (float) ((cal.y[i] * max_analog[screw_index]*22)/4095) / 10000,
            (float) oa->curve.x[i] / 10.0, (float) oa->curve.y[i] / 100.0,
            (float) ((oa->curve.y[i] * max_analog[screw_index]*22)/4095) / 10000);
        print_at(4, 14 + i, buf);
    }
    for(i=0;i<9;i++)
    {
        if(cal.x[i] >= cal.x[i+1] || cal.y[i] >= cal.y[i+1] || cal.x[0] == 0)
        {
            print_at(8,5,"Calibration Failed: RPMS OUT OF ORDER");
            *global[pid->cv_1].data.value = 0;
            read_term_return_choice ();
            max_analog[screw_index] = old_max_analog;
            return(0);
        }
    }
    print_at(8,5, "Calibraition Finished: Use New Calibration (Y/N):");
    *global[pid->cv_1].data.value = 0;  /*stop screw*/
    read_term_return_choice ();
    if(ascii_in[0] == 'Y' || ascii_in[0] == 'y')
    {
        for(i=0;i<10;i++)
        {
            oa->curve.x[i] = cal.x[i];
            oa->curve.y[i] = cal.y[i];
        }
    }
    return(1);
}

/************************************************************
 * read_curve - routine extraplotes an output using a 10pt
 *     array.
 * 6/1/92
 ************************************************************/
long read_curve(long x, long min_out, struct_x_y *curve)
{
    short i;
    if(x <= 2)              return(min_out);
```

```
        if(x <= curve->x[0])    return(curve->y[0]);
        if(x >= curve->x[9])    return(curve->y[9]);

for(i=1; i<10; i++)
        {
                if(x < curve->x[i])
                {
                        long temp;
                        temp =  (curve->y[i] - curve->y[i-1]) * (x - curve->x[i-1]);
                        return( temp / max(1,curve->x[i] - curve->x[i-1]) + curve->y[i-1]);
                }       /*because max() is used to keep from dividing by zero*/
        }               /*the curve should increase with higher index*/
}
/**********************************************************
 * read_curve_2 - routine extraplotes an output using a 10pt
 *    array.
 * 6/1/92
 **********************************************************/
long read_curve_2(long y, long min_out, struct_x_y *curve)
{
        short i;
        if(y <= min_out)        return( 0 );
        if(y <  curve->y[0])
                return( max(0, (curve->x[0] * (y - min_out)) / max(1, curve->y[0] - min_out) ) );
        if(y <= curve->y[0])    return(curve->x[0]);
        if(y >= curve->y[9])    return(curve->x[9]);

for(i=1; i<10; i++)
        {
                if(y < curve->y[i])
                {
                        long temp;
                        temp =  (curve->x[i] - curve->x[i-1]) * (y - curve->y[i-1]);
                        return( temp / max(1,curve->y[i] - curve->y[i-1]) + curve->x[i-1]);
                }       /*because max() is used to keep from dividing by zero*/
        }               /*the curve should increase with higher index*/
}
/**********************************************************
 * check_fdbk - routine checks fdbk to determine if
 *    fdbk is in range and above threshold if so then
 *    a 1 is returned else a 0 is returned.  Note that
 *    switching between Good and Bad fdbk takes a few
 *    counts.
 * 6/1/92
 **********************************************************/
short check_fdbk(short fdbk, long *temp_x, struct_open_add *oa, struct_pid *pid)
{
        long temp_diff, temp_out;

temp_out = *global[pid->cv_1].data.value/100;
        if(temp_out > pid->lowwer_lim && temp_out <= 6000)
                temp_out -= oa->out_cor_low;
```

```c
        else if(temp_out > 6000)
            temp_out -= oa->out_cor_high;

temp_out  = max(0, temp_out);
    temp_out  = min(pid->upper_lim, temp_out);

*temp_x      =    read_curve_2(temp_out,  pid->lowwer_lim,
&oa->curve);
    temp_diff = abs(*global[pid->pv].data.value - *temp_x);

/**Check difference between theoritical screw rate and adj screw*/
    if(temp_out > pid->lowwer_lim &&
        (temp_diff > oa->fdbk_range    ||

/*No fdbk excluding case where output is low*/
        (*global[pid->pv].data.value < oa->fdbk_threshold &&
         temp_out >= oa->curve.y[0])))

{
        oa->time_bad +=  2;
        if(oa->time_bad > 50)  /*takes max 2.5 secs of bad to cause open loop*/
        {
            oa->time_bad = 61;
            return(0);    /* no fdbk*/
        }
    }
    else
    {
        oa->time_bad--;
        if(oa->time_bad < 20)  /*takes 4 sec to come back to closed loop*/
        {
            oa->time_bad = 0;
            return(1);  /* fdbk ok */
        }
    }
    return(fdbk);  /*no change in fdbk status*/
}

/************************************************************
 * correct_curve - because of loading and leakage in the
 *   hydraulic system the calibration curve will probably run
 *   low and change of time, to help compensate for this
 *   change we added a correction term (one for high outputs
 *   one for low outputs). The correction terms will be
 *   as long as feedback is present and system is judged stable
 ************************************************************/
long correct_curve(long *cor, long sumpi)
{
    long temp_cor;
    temp_cor = *cor;
    *cor    += sign(sumpi) * min(5,abs(sumpi));
    *cor     = max( 20, *cor);    /*max correction is 0.2% to +10%*/
    *cor     = min( 1000, *cor); /*increase is higher because of load*/
                                  /*Note from sand test 1% = 6 RPMs*/
    /*remove the corrected portion from sumpi*/
    sumpi  += temp_cor - *cor;
    return(sumpi);
```

```
}
/****************************************************
 * open_add_auto - if system in AUTO then routine is called
 *   and determines the analog output using a curve and PI
 *   algorithm.
 * 6/4/92
 ****************************************************/
long open_add_auto (short fdbk, struct_open_add *oa,
                                struct_pid   *pid,   struct_error *error)
{
    long temp_out, old_sumpi;
    temp_out  =   read_curve(*global[pid->sp].data.value, pid->lowwer_lim, &oa->curve);

old_sumpi = oa->sumpi;
    oa->sumpi += pid_run(pid, error);  /*pi portion*/

/*auto correction of curve*/
    if(fdbk && abs(error->err) < 5 && abs(error->ve) < 2)
    {
            /*make sure output is up in a linear range*/
        if(temp_out > oa->curve.y[1] && temp_out <= 6000)
            oa->sumpi  =    correct_curve(&oa->out_cor_low, oa->sumpi);
        else if(temp_out > 6000 && temp_out < pid->upper_lim)
            oa->sumpi  =    correct_curve(&oa->out_cor_high, oa->sumpi);
    }
    /*add correction percentage to output*/
    if(temp_out > pid->lowwer_lim && temp_out <=6000)   /*60%*/
        temp_out += oa->out_cor_low;
    else if( temp_out > 6000)   /* > 60%*/
        temp_out += oa->out_cor_high;

/*limit difference between pi output and curve*/
    if(abs(oa->sumpi) > oa->max_diff)
        oa->sumpi = sign(oa->sumpi) * oa->max_diff;

/*use sumpi only if feed back is correct */
    if( !fdbk)
        oa->sumpi = 0;
    temp_out += oa->sumpi;

/*put control var into output var output[]*/
    temp_out -= (*global[pid->cv_1].data.value / 100);
    if(abs(temp_out) > pid->max_du)  /*check for maximum change of output*/
    {
        /*if output is limited remove the last addition of pi
           reduce overshoot due to wind up*/
        if(sign(oa->sumpi - old_sumpi) == sign(temp_out))
            oa->sumpi = old_sumpi;
        temp_out = sign(temp_out) * pid->max_du;
    }

/*only put output if unstick option is off or almost off
      keep from reducing the effect of hard hits*/
    if(oa->unstick_cycles < 1)
        *global[pid->cv_1].data.value += (temp_out * 100);

/*limit minimum and maximum of output */
```

```c
        *global[pid->cv_1].data.value = max(pid->lowwer_lim*100,
            *global[pid->cv_1].data.value);
        *global[pid->cv_1].data.value = min(pid->upper_lim*100,
            *global[pid->cv_1].data.value);
}
/************************************************************
 * unstick_option - routine sends a high output
 *   for a count of (unstick) in order to start the screw
 *   turning.
 *   6/9/92
 ************************************************************/
long unstick_option(short fdbk, short opt, struct_open_add *oa,
struct_pid *pid)
{
        oa->unstick_on  = max(0, oa->unstick_on);
        oa->unstick_on  = min(30, oa->unstick_on);  /*limit on counts
to 3 sec*/
        oa->unstick_off = max(0, oa->unstick_off);
        oa->unstick_off = min(30, oa->unstick_off);

if(oa->unstick_on <= 0 || oa->unstick_out <= 0)  /*unstick
option is off*/
        {
                oa->unstick_cycles = 0;
                return(0);
        }
        if(!opt)        /*just started auto, allows user to toggle
auto/manual */
        {               /*to try and unstick screw */
                /*if not any feedback and output less than unstick
output - 10% and
                  output is trying to move screw use hard hit*/
                if(!fdbk  &&    *global[pid->cv_1].data.value/100   >
pid->lowwer_lim)
                {
                        if(time - oa->time_1 < 3000)   /*difference less
than 30 seconds*/
                                oa->unstick_cycles = 7;  /*more cycles*/
                        else
                                oa->unstick_cycles = 3;
                        oa->time_1 = time;
                        oa->unstick_count = -oa->unstick_off;
                }
        }
        else if(oa->unstick_cycles < 1)
        {       /*been in auto but just got a significant set point*/
                if( oa->previous_sp < oa->fdbk_threshold &&
                    *global[pid->sp].data.value > oa->fdbk_threshold)
                {
                        if(time - oa->time_1 > 3000)   /*diff greater than
30 seconds*/
                                oa->unstick_cycles = 3;
                        oa->time_1 = time;
                        oa->unstick_count = -oa->unstick_off;
                }
        }
        /*hard hit on screw is only for a short time and is used to
help
          get screw started turning.*/
        if(oa->unstick_cycles > 0 )
        {
```

```
            if(oa->unstick_count < 0)
                *global[pid->cv_1].data.value = (pid->lowwer_lim +
5) * 100;
            else
                *global[pid->cv_1].data.value = oa->unstick_out *
100;

if (*global[pid->pv].data.value > oa->fdbk_threshold +
50)
                oa->unstick_cycles = 0;      /*get out of unstick*/ oa->unstick_count++;
            if(oa->unstick_count > oa->unstick_on)
            {
                oa->unstick_cycles--;
                oa->unstick_count = -oa->unstick_off;
            }
        }
        return(1);
    }
/******************************************************************
 *  load_screw_count
 *  screw_flow_count is used in calculating sand deliverly
 *     and in displaying concentration on OIP, but is not used
 *     in controlling the screw.  Therefore limits on change of
 *     screw_flow_count does not effect the control of screw but
 *     does effect the display and sand ramps.
 *  6/25/92
 ******************************************************************/
int load_screw_count(short index, short fdbk, long adj_freq, long
cal_freq,
        int old_screw_count, long unstick_on)
{
    if(!fdbk)
    {
        ss_fdbk_lost[index] = 1;
        screw_flow_count[index] = cal_freq;
    }
    else
    {
        ss_fdbk_lost[index] = 0;
        screw_flow_count[index] = adj_freq;
    }
    /*0 sand delivered if in unstick mode*/
    if(unstick_on)
        screw_flow_count[index] = 0;
    /*limit increase in screw_flow_count[] to 25 rpm per count
      means 1.6sec to full speed */
    if(screw_flow_count[index] - old_screw_count > 250)
            screw_flow_count[index] = old_screw_count + 250;
    return(screw_flow_count[index]);
}

/******************************************************************
 * open_add_1 - routine uses a combination of open loop and
 *   pi.  A curve is read and then the output is corrected
 *   using pi.
 *   6/1/92
 ******************************************************************/
long open_add_1( short edit_run)
{
    static struct_open_add oa;
```

```c
        static struct_pid   pid  ;
        static struct_error error;
        static short auto_count, edit_on;
        static short fdbk;
        static int old_screw_count;
        long cal_freq;

switch(edit_run)   /* Auto, Manual, Edit, Initialize*/
        {
        case EDIT_TERMINAL: /*edit pid parameters*/
             edit_on = 99;
             pid_edit(&pid);
             open_add_edit_1(&oa, &pid);
             open_add_edit_2(&oa, &pid, 1);   /*calibration screen*/
             edit_on = 0;
        case CAL:
             auto_cal_screw(1, &oa, &pid);
             break;
        case AUTO:         /*run pid */
             if(auto_count)
             {
                    unstick_option(fdbk,  auto_count,   &oa,   &pid);
/*bumps output to unstick screw*/
                    open_add_auto (fdbk, &oa, &pid, &error);
             }
             else
             {
                    unstick_option(fdbk,  auto_count,   &oa,   &pid);
/*bumps output to unstick screw*/
                    pid_run(&pid, &error);
                    auto_count = 1;
             }
             break;

case MANUAL:   /*backup parameters*/
             oa.unstick_cycles = 0;
             auto_count=0;
             break;
        case INITIALIZE_VARIABLES:
             edit_on = 0;
             pid.filter_pv = 10000000;
             pid.delta_partial_s7 = 0;
             auto_count=0;
             pid.partial_du = 0;
             pid.err1 = pid.t1 = pid.count = 0;
             pid.extra_var = 5; /*adj_flow_count[4]*/
             pid.sp   = 3;   /*set_point[1]*/
             pid.cv_1 = 1;   /*output[1]*/
             pid.cv_2 = 1;
             pid.pv   = 5;   /*adj_flow_count[4]*/
             pid.accum_diff = 1;
             pid.inverse_control=1;
             pid.P = 300000; /*300*/
             pid.I = 6000;   /*0.1 min*/
             pid.D = 0;
             pid.dead_band = 0;                    pid.stdev_pv = 0;
             pid.offset_pos=0;                     pid.offset_neg=0;
             pid.max_du = 1500; /*15% max change in output per step*/
             pid.max_diff_sp = 0; /*5 bbl/min*/
             pid.lower_lim = 1838;
             pid.upper_lim = 10000;  /*limit CV to 100%*/
             pid.time_offset = 0;
             pid.time_range = 0;
```

```
            pid.gper = 0;
            pid.minerr = 2000;
            pid.time_dead_band = 0;
            pid.PB_min = pid.P;

oa.unstick_cycles= 0;
            oa.unstick_count = 0;
            oa.unstick_off   = 6;      /*off counts*/
            oa.unstick_on    = 6;      /*on counts*/
            oa.unstick_out   = 4000;   /*40 % output*/
            oa.out_cor_low   = 20;
            oa.out_cor_high  = 20;
            oa.cal_time      = 1000;   /*10 sec*/
            oa.max_low_hz    = 3800;
            oa.low_hz        = 30;     /*ADJ 20 hz*/
            oa.high_hz       = 60;     /*ADJ 60 hz*/
            oa.sumpi         = 0;             /* output from pi portion */
            oa.max_diff      = 1000;   /* 10 % max difference */
            oa.fdbk_range    = 400;    /* adjusted 40 rpm*/
            oa.fdbk_threshold = 5;     /* adjusted 5 rpm */
            oa.curve.x[0] = 40;         oa.curve.y[0] = 1900;
            oa.curve.x[1] = 460;        oa.curve.y[1] = 2800;
            oa.curve.x[2] = 880;        oa.curve.y[2] = 3700;
            oa.curve.x[3] = 1300;       oa.curve.y[3] = 4600;
            oa.curve.x[4] = 1720;       oa.curve.y[4] = 5500;
            oa.curve.x[5] = 2140;       oa.curve.y[5] = 6400;
            oa.curve.x[6] = 2560;       oa.curve.y[6] = 7300;
            oa.curve.x[7] = 2980;       oa.curve.y[7] = 8200;
            oa.curve.x[8] = 3400;       oa.curve.y[8] = 9100;
            oa.curve.x[9] = 3820;       oa.curve.y[9] = 10000;
            break;
     case EDIT_OFF:   /*retrieve backed up parameters*/
            fdbk = 1;
            oa.time_1 = 0;
            oa.previous_sp = 0;
            edit_on        = 0;
            auto_count = 0;
            old_screw_count = 0;
            return(pid_data_check(&pid));
            break;
     }
     /*previous set point */
     oa.previous_sp = *global[pid.sp].data.value;
     fdbk = check_fdbk (fdbk, &cal_freq, &oa, &pid); /*0 if NO
fdbk, 1 if fdbk*/
     /* set pid parameters equal to their oip counter parts */
     if(edit_on == 99)
            set_globalpid_equal_localpid(1, &pid);
     else
            set_localpid_equal_globalpid(1, &pid); /*1 array num of
global*/

/*make sure low output is below curve*/
     if(pid.lowwer_lim >= oa.curve.y[0])
     {
            pid.lowwer_lim = max(0, oa.curve.y[0] - 200);  /*200 =
2%*/
            set_globalpid_equal_localpid(1, &pid);
     }
     old_screw_count    =    load_screw_count(0,   fdbk,
*global[pid.pv].data.value,
                   cal_freq, old_screw_count, oa.unstick_cycles);
```

```
        return(fdbk);
}

/***********************************************************
 * open_add_2 - routine uses a combination of open loop and
 *    pi.  A curve is read and then the output is corrected
 *    using pi.
 *    6/1/92
 ***********************************************************/
long open_add_2( short edit_run)
{
        static struct_open_add oa;
        static struct_pid     pid  ;
        static struct_error error;
        static short auto_count, edit_on;
        static short fdbk;
        static int old_screw_count;
        long cal_freq;

switch(edit_run)   /* Auto, Manual, Edit, Initialize*/
        {
        case EDIT_TERMINAL: /*edit pid parameters*/
                edit_on = 99;
                pid_edit(&pid);
                open_add_edit_1(&oa, &pid);
                open_add_edit_2(&oa, &pid, 2);  /*calibration screen*/
                edit_on = 0;
        case CAL:
                auto_cal_screw(2, &oa, &pid);
                break;
        case AUTO:         /*run pid */
                if(auto_count)
                {
                        unstick_option(fdbk,    auto_count,    &oa,    &pid);
/*bumps output to unstick screw*/
                        open_add_auto (fdbk, &oa, &pid, &error);
                }
                else
                {
                        unstick_option(fdbk,    auto_count,    &oa,    &pid);
/*bumps output to unstick screw*/
                        pid_run(&pid, &error);
                        auto_count = 1;
                }
                break;

case MANUAL:   /*backup parameters*/
                oa.unstick_cycles = 0;
                auto_count=0;
                break;
        case INITIALIZE_VARIABLES:
                edit_on = 0;
                pid.filter_pv = 10000000;
                pid.delta_partial_s7 = 0;
                auto_count=0;
                pid.partial_du = 0;
                pid.err1 = pid.t1 = pid.count = 0;
                pid.extra_var = 6; /*adj_flow_count[5]*/
                pid.sp   = 4;   /*set_point[2]*/
                pid.cv_1 = 2;   /*output[2]*/
                pid.cv_2 = 2;
                pid.pv   = 6;   /*adj_flow_count[5]*/
```

```
            pid.accum_diff = 1;
            pid.inverse_control=1;
            pid.P = 300000;  /*300*/
            pid.I = 6000;    /*0.1 min*/
            pid.D = 0;
            pid.dead_band = 0;              pid.stdev_pv = 0;
            pid.offset_pos=0;               pid.offset_neg=0;
            pid.max_du = 1500; /*15% max change in output per step*/
            pid.max_diff_sp = 0; /*5 bbl/min*/
            pid.lowwer_lim = 1838;
            pid.upper_lim  = 10000;
            pid.time_offset = 0;
            pid.time_range = 0;
            pid.gper = 0;
            pid.minerr = 2000;
            pid.time_dead_band = 0;
            pid.PB_min =.pid.P;

oa.unstick_cycles= 0;
            oa.unstick_count = 0;
            oa.unstick_off   = 6;      /*off counts*/
            oa.unstick_on    = 6;      /*on counts*/
            oa.unstick_out   = 4000;   /*40 % output*/
            oa.out_cor_low   = 20;
            oa.out_cor_high  = 20;
            oa.cal_time      = 1000;   /*10 sec*/
            oa.max_low_hz = 3800;
            oa.low_hz   = 30;     /*ADJ 20 hz */
            oa.high_hz  = 60;     /*ADJ 60 hz */
            oa.sumpi    = 0;          /* output from pi portion */
            oa.max_diff = 1000;       /* 10 % max difference */
            oa.fdbk_range = 400;      /* adjusted 40 rpm */
            oa.fdbk_threshold = 5;    /* adjusted 0.5 rpm */
            oa.curve.x[0] = 40;       oa.curve.y[0] = 1900;
            oa.curve.x[1] = 460;      oa.curve.y[1] = 2800;
            oa.curve.x[2] = 880;      oa.curve.y[2] = 3700;
            oa.curve.x[3] = 1300;     oa.curve.y[3] = 4600;
            oa.curve.x[4] = 1720;     oa.curve.y[4] = 5500;
            oa.curve.x[5] = 2140;     oa.curve.y[5] = 6400;
            oa.curve.x[6] = 2560;     oa.curve.y[6] = 7300;
            oa.curve.x[7] = 2980;     oa.curve.y[7] = 8200;
            oa.curve.x[8] = 3400;     oa.curve.y[8] = 9100;
            oa.curve.x[9] = 3820;     oa.curve.y[9] = 10000;
            break;
        case EDIT_OFF:  /*retrieve backed up parameters*/
            fdbk = 1;
            oa.time_1 = 0;
            oa.previous_sp = 0;
            edit_on    = 0;
            auto_count = 0;
            old_screw_count = 0;
            return(pid_data_check(&pid));
            break;
    }
    /*previous set point */
    oa.previous_sp = *global[pid.sp].data.value;

fdbk = check_fdbk (fdbk, &cal_freq, &oa, &pid); /*0 if NO
fdbk,  1 if fdbk*/
    /* set pid parameters equal to their oip counter parts */
    if(edit_on == 99)
        set_globalpid_equal_localpid(2, &pid);
```

```c
    else
        set_localpid_equal_globalpid(2, &pid); /*1 array num of global*/
    /*make sure low output is below curve*/
    if(pid.lowwer_lim >= oa.curve.y[0])
    {
        pid.lowwer_lim = max(0, oa.curve.y[0] - 200); /*200 = 2%*/
        set_globalpid_equal_localpid(2, &pid);
    } old_screw_count   =   load_screw_count(1, fdbk, *global[pid.pv].data.value,
                    cal_freq, old_screw_count, oa.unstick_cycles);
    return(fdbk);
}

/*************************************************************
 * menu_mf - contains miscellanous routines for displaying
 *   data to a terminal, some control routines, and other.
 *   module should have contr_mf used with it.
 *   Try and put code that does not change much in menu_mf.
 *************************************************************/ include "define.h"   /*include for address to digital out*/
define where extern
    #include "\contr\comvar.h"
    #include "varable.h"
undef where define where
    #include "constant.h"
#undef where

/*************************************************************/
    long master_pos;  /*used to locate cursor on main display screen*/

/*************************************************************/
/*************************************************************
 * Function Prototypes for NEWSTUFF.C*/
/*functions allow for accurate placement of cursor*/
    long display_time(char *buf, long t);
    long print_at(short x, short y, char *text);
    long print_at_no4(short x, short y, char *text);
    short text_length(char *text);
    long gotoxy(short x, short y);
    long erase_x_chars(short x);
/*functions called by display choices for entering data*/
    long enter_rpm(short option, struct_data *ptr);
    long enter_pwm(short option, struct_data *ptr);
    long enter_intasfloat(short option, struct_data *ptr);
    long enter_0to10000 (short option, struct_data *ptr);
    long enter_intasfloat_I_min(short option, struct_data *ptr);
    long enter_density(short option, struct_data *ptr);
    long enter_spvol (short option, struct_data *ptr);
    long enter_int   (short option, struct_data *ptr);
    long point_value (short option, struct_data *ptr);
```

```c
    long digital_value(short option, struct_data *ptr);
    long return_choice(short option, struct_data *ptr);
    long return_1     (short option, struct_data *ptr);
    long return_0     (short option, struct_data *ptr);
    long add_inuse    (short option, struct_data *ptr);
    long auto_manual  (short option, struct_data *ptr);
    long function_text(short option, struct_data *ptr);
    long loop_text    (short option, struct_data *ptr);
    long display_choices(short option, short start, short end,
struct_com enter[]);
    long display_globals(short option, short start, short end,
                                        struct_com enter[]);
    long    display_only(short    option,   short   start,   short
end,struct_com enter[]);
    long display_loop();
    long change_globals();
    long change_globals_master();
    long sign(long num);
    long psuedo_noise(long t);

long display_function(long loop_num);

/************************************************************
 * control functions
 ************************************************************/
    long nop(short edit0_run1);
    long open_add_1(short edit0_run1);
    long open_add_2(short edit0_run1);
    long dry_add_1(short edit0_run1);
    long dry_add_2(short edit0_run1);
    long nop(short edit0_run1);
    long ffwd_gel_rate(short edit0_run1);
    long pid_pwm(short edit0_run1);
    long pid1(short edit0_run1);
    long pid2(short edit0_run1);
    long pid3(short edit0_run1);
    long pid_pwm_tub_only(short edit0_run1);
    long pid_tub_only_4inch(short edit0_run1);
    long display_vars(short edit0_run1);
    /old parker valve routines/
    long pid_8inch_valve(short option);

/************************************************************
 *set_global - one time initialization routine for
 *   setting the global list pointers.
 * 11/18/91
 ************************************************************/
long dumb;
long mod0;      /*used as globals for testing loops*/
long setp_long[2];  /*setpoints as long ints*/
struct_com global[global_num];

char *global_ini_text[]={
"Enter choice", "Output 1", "Output 2", "Set Pt 1", "Set Pt 2",
    "Adj Flo1" , "Adj Flo2", "Screw 1 ", "Screw 2 ", "Snd Con1",
    "Snd Con2",
    "DUMB"};

char *function_ini_text[] = {
        "[0] nop ", "[1] Open Add 1","[2] Open Add 2", "[3] Pid",
```

```
        "[4] Display routine"};
    char *loop_ini_text[] = {
        "Loop #0", "Screw 1", "Screw 2","Loop #3", "Loop #4",
        "Loop #5", "Loop #6", "Loop #7","Loop #8", "Loop #9"};

long set_global()
{
    int i, j;

global[0].data.value = &time;                global[0].func
= return_choice;    global[0].data.max_value=1;
    global[1].data.value = &output[1];           global[1].func =
enter_0to10000;  global[1].data.max_value=1000000;
    global[2].data.value = &output[2];           global[2].func =
enter_0to10000;  global[2].data.max_value=1000000;
    global[3].data.value = &set_point[1];        global[3].func
= enter_rpm;  global[3].data.max_value=10000;
    global[4].data.value = &set_point[2];        global[4].func
= enter_rpm;  global[4].data.max_value=10000;
    global[5].data.value = &adj_flow_long[0];
global[5].func = enter_rpm;  global[5].data.max_value=10000;
    global[6].data.value = &adj_flow_long[1];
global[6].func = enter_rpm;  global[6].data.max_value=10000;
    global[7].data.value = &screw_flow_long[0];  global[7].func
= enter_rpm;  global[7].data.max_value=10000;
    global[8].data.value = &screw_flow_long[1];  global[8].func
= enter_rpm;  global[8].data.max_value=10000;
    global[9].data.value = &sand_con_sp_s7[0];   global[9].func
= enter_density;  global[9].data.max_value= SHIFT7;
    global[10].data.value= &sand_con_sp_s7[1];   global[10].func=
enter_density;  global[10].data.max_value= SHIFT7;
    global[11].data.value = &dumb;               global[11].func
= enter_int;    global[11].data.max_value=1;

for(i=0;i<global_num;i++)
    {
        global[i].data.text = global_ini_text[i];
        global[i].data.x = 1;
        global[i].data.y = 22;
    } function[0].func = nop;
    function[1].func = open_add_1;
    function[2].func = open_add_2;
    function[3].func = pid1;
    function[4].func = display_vars;

for(i=0;i<TOTAL_FUNCTIONS;i++)
    {
        function[i].option = NOT_USED;
        function[i].text = function_ini_text[i];
        if(function[i].func(EDIT_OFF) == INITIALIZE_VARIABLES)
            default_functions();  /*initialize controller*/
    }

/set loop_struct stuff/
    set_loop_struct();

nop(1);
    return(1);
}
/*************************************************************
```

```c
 * func_used - routine checks loop_struct[].option to
 *    determine if a function has been used.  This is
 *    different then checking to see if a function's option
 *    is listed as NOT_USED, since this routine cannot not
 *    be fooled.
 * 6/8/92
 **********************************************************/
func_used(int num, short opt)
{
    int i;
    for(i=0; i < num; i++)
    {
        if(loop_struct[i].option == opt)
            return(1);
    } return(0);
}
/**********************************************************
 * set_loop_struct - routine updates and fills loop_struct
 *    with the correct parameters.  Called upon initialization
 *    and startup.
 * 6/8/92
 **********************************************************/
int set_loop_struct()
{
    short i;
    /set loop_struct stuff/
    for(i=0;i<10;i++)
    {
        loop_struct[i].option = max(0, loop_struct[i].option);
        loop_struct[i].option   =   min(TOTAL_FUNCTIONS-1, loop_struct[i].option);
        if(func_used(i, loop_struct[i].option ))
            loop_struct[i].option = 0;
        if(loop_struct[i].option)
            function[loop_struct[i].option].option = MANUAL;
        else
            function[loop_struct[i].option].option = NOT_USED;
        loop_struct[i].func = function[loop_struct[i].option].func;
        loop_struct[i].text = loop_ini_text[i];
    }
}
/**********************************************************
 * default_functions () called by entering 'i'
 *    default paramters will then be used for controllers
 * 3/18/92
 **********************************************************/
default_functions()
{
    short i;
    for(i=0;i<TOTAL_FUNCTIONS;i++)
        function[i].func(INITIALIZE_VARIABLES);

/*loop struct default*/
    loop_struct[0].option = 0;
    loop_struct[1].option = 1;
    loop_struct[2].option = 2;
    loop_struct[3].option = 0;
    loop_struct[4].option = 0;
    loop_struct[5].option = 0;
    loop_struct[6].option = 0;
```

```
        loop_struct[7].option = 0;
        loop_struct[8].option = 0;
        loop_struct[9].option = 0;

set_loop_struct();
        /*set switch between flow loop and tub to automatic
          depending on choice of flow meter and clean_flow rate
        */
        tub_flow_option = 1;

}

/************************************************************
 * gotoxy()- places cursor at x and y position
 *    0,0 is upper left corner of screen
 ************************************************************/
long gotoxy(short x, short y)
{
        char buf[80];
        sprintf(buf, "\233H\233%ldB\233%ldC",y,x);
        print_printbuf(buf);
        return(1);
}
/************************************************************
 *check_range_of_global() - checks to be sure that
 *  value is inside of valid range
 *   3/6/92
 ************************************************************/
int check_range_of_global(long *ptr)
{
 if( *ptr < 1 || *ptr > global_num - 1)
     *ptr = global_num-1;
 return((int) *ptr);
}

/************************************************************
 * text_length(char *text)
 * 12/11/91
 ************************************************************/
short text_length(char *text)
{
        short i=0;
        while(*(text+i)) i++;
        return(i);
}
/************************************************************
 * read_term_return_choice () - routine calls the
 *   neccessary function for reading the terminal depending
 *   on whether old communication software is used or
 *   Ron's Combo software.  Routine returns appropiate
 *   value if 'q' or up arrows are typed
 * 5/27/92
 ************************************************************/
short read_term_return_choice ()
{
        char key;   int i, len;
        short hold time;
        print_printbuf(" ?\004");
        clear_old_message();            /*sets input_string_available =
0*/

/*read_term_input_until_cr();*/ /*reads into ascii_in using nchar.c*/
```

```c
    while(!ascii_message());  /*old way of reading terminal*/ len = text_length(ascii_in);
    for(i=0;i<len;i++)
    {
        if(ascii_in[i] == 'q') return(QUIT);
        if(ascii_in[i] == 'B') return(1);
        if(ascii_in[i] == 'C') return(5);
        if(ascii_in[i] == 'A') return(-1);
        if(ascii_in[i] == 'D') return(-5);
        if(ascii_in[i] == 'u') return(4);
    }
    /*number entered positive, neg, or decimal*/
    if(isdigit(ascii_in[0]) || ascii_in[0] == '-' || ascii_in[0]
== '.')
        return(6);

return(3);
}
/***************************************************************
 * erase_x_chars()
 ***************************************************************/
long erase_x_chars(short x)
{
    long i;
    for(i=0;i<x;i++)
        OUTCHR(0x20);    /*send space*/
    for(i=0;i<x;i++)
        OUTCHR(0x08);    /*send backspace*/
    OUTCHR(0x04);        /*end transmission*/
}
/***************************************************************
 * print_at() - prints text at cursor position x and y
 ***************************************************************/
long print_at(short x, short y, char *text)
{
    gotoxy(x,y);
    print_printbuf(text);
    OUTCHR(0x04);
    return(1);
}
/***************************************************************
 * print_at_no4() - prints text at cursor position x and y
 ***************************************************************/
long print_at_no4(short x, short y, char *text)
{
    gotoxy(x,y);
    print_printbuf(text);
/*  OUTCHR(0x04);*/
    return(1);
}
/***************************************************************
 * display_choices() - basic building block for menu screens
 ***************************************************************/
long display_choices(short option, short start, short end,
                                    struct_com enter[])
{
    short i,position, return_value=1;
    char buf[80];
    position = start;

if(option==CLEAR_BUILD)
        clear_the_screen();
```

```
        REDISPLAY:
        for(i=start;i<end;i++)
                enter[i].func(0,&enter[i].data); /*display only*/ while(return_value && return_value != QUIT)
        {
                return_value =
enter[position].func(1,&enter[position].data);
                if(return_value == 4)
                        goto REDISPLAY;
                if(return_value == 2)
                {
                        clear_the_screen();
                        position ++;
                        if(position <= -1)  position = end-1;
                        if(position >= end) position = start;
                        goto REDISPLAY;
                }
                position += return_value;
                if(position <= -1)  position = end + return_value;
                if(position >= end) position = start;
                if(position <= -1)  position = end-1;
        }
        return((long) return_value);
}
/**************************************************************
 * display_globals() - displays the global text only
 *    12/11/91
 **************************************************************/
long display_globals(short option, short start, short end,
                                        struct_com enter[])
{
        short i,x,y;
        char buf[20];
        if(option==CLEAR_BUILD)
                clear_the_screen();
        x=1;      y=1;
        for(i=start;i<end;i++)
        {
                sprintf(buf,"[%ld] %s",i,enter[i].data.text);
                print_at_no4(x,y,buf);
                x +=16;
                if(x > 66)
                {
                        x = 1;
                        y++;
                }
        }
        OUTCHR(0x04);
        return(1);
}
/**************************************************************
 * change_globals - routine displays all globals and
 *     allows for their value to be changed
 * 11/26/91
 **************************************************************/
long change_globals_master()
{
        global[0].data.max_value = 1; /*initialize*/
        display_globals(CLEAR_BUILD, 1, global_num, global);
        if(display_choices(BUILD, 0, 1, global)==QUIT)
                return(QUIT);
```

```
        change_globals();
        return(1);
}
long change_globals()
{
        print_at(60,22,"EDITING VALUE");
        while(global[0].data.max_value > 0 && global[0].data.max_value
< global_num)
        {
                global[global[0].data.max_value].data.x = 1;
                global[global[0].data.max_value].data.y = 22;
                print_at(1, 22, "
        ");
                display_choices(BUILD,   global[0].data.max_value,   1,
global);
                /*clear the line*/
                print_at(1, 22, "
        ");
                if(display_choices(BUILD, 0, 1, global)==QUIT) break;
        }
        print_at(1, 22, "
                        ");
        return(1);
}
/*****************************************************
 * display_loop-
 *      11/20/91
 *****************************************************/
long display_loop()
{
        short i,j;
        struct_com enter[]={
                20,    1,   0,   0,   "MASTER  DISPLAY  FOR  DEFINING
LOOPS",return_1,
                10,    3,   0,   0,   "LOOP", return_1,
                27,    3,   0,   0,   "AUTO/MANAUL", return_1,
                49,    3,   0,   0,   "FUNCTION", return_1,
                10,   18,   0,   0,   "c = change control function", return_1,
                10,   19,   0,   0,   "e = edit control function", return_1,
                10,   20,   0,   0,   "t = toggle between AUTO/MANUAL", return_1,
                10,    4,   0,   0,   " ",loop_text,
                10,    5,   1,   0,   " ",loop_text,
                10,    6,   2,   0,   " ",loop_text,
                10,    7,   3,   0,   " ",loop_text,
                10,    8,   4,   0,   " ",loop_text,
                10,    9,   5,   0,   " ",loop_text,
                10,   10,   6,   0,   " ",loop_text,
                10,   11,   7,   0,   " ",loop_text,
                10,   12,   8,   0,   " ",loop_text,
                10,   13,   9,   0,   " ",loop_text,
                30,    4,   0,   0,   " ",auto_manual,
                50,    4,   0,   0,   " ",function_text,
                30,    5,   1,   0,   " ",auto_manual,
                50,    5,   1,   0,   " ",function_text,
                30,    6,   2,   0,   " ",auto_manual,
                50,    6,   2,   0,   " ",function_text,
                30,    7,   3,   0,   " ",auto_manual,
                50,    7,   3,   0,   " ",function_text,
                30,    8,   4,   0,   " ",auto_manual,
                50,    8,   4,   0,   " ",function_text,
                30,    9,   5,   0,   " ",auto_manual,
                50,    9,   5,   0,   " ",function_text,
```

```
            30, 10, 6, 0, " ",auto_manual,
            50, 10, 6, 0, " ",function_text,
            30, 11, 7, 0, " ",auto_manual,
            50, 11, 7, 0, " ",function_text,
            30, 12, 8, 0, " ",auto_manual,
            50, 12, 8, 0, " ",function_text,
            30, 13, 9, 0, " ",auto_manual,
            50, 13, 9, 0, " ",function_text,
            10, 21,0, 0,  "v = Edit global variables", return_1,
            10, 22,0, 0,   "QUESTIONS ?   CALL  Mark  Farabee
251-4106",return_1,
      };
      display_choices(CLEAR_BUILD, 0,39, enter);
      clear_the_screen();
}
/************************************************************
 * point_value - allows selection of global variables from
 *     global.
 * 11/18/91
 ************************************************************/
long point_value(short option, struct_data *ptr)
{
      char buf[80];
      short return_value=3;

check_range_of_global(ptr->value);
      print_at(ptr->x, ptr->y, ">");
      print_at(ptr->x+1, ptr->y, ptr->text);
      global[*ptr->value].data.x = ptr->x+1+text_length(ptr->text);
      global[*ptr->value].data.y = ptr->y;
      global[*ptr->value].func(0, &global[*ptr->value].data);

if(option)
      {
            return_value = read_term_return_choice ();
            if(return_value==3 && ascii_in[0] == 'c')
            {
                  global[0].data.max_value    =    *ptr->value;
/*initialize*/
                  display_globals(CLEAR_BUILD, 1, global_num, global);
                  display_choices(BUILD, 0, 1, global);
                  if(global[0].data.max_value     >    0   &&
global[0].data.max_value < global_num)
                        *ptr->value = global[0].data.max_value;
                  return(2);
            }
            if(ascii_in[0] == 'v')
            {
                  global[*ptr->value].func(1,
&global[*ptr->value].data);
                  return_value = 1;
            }
            if(return_value==3 || return_value==6) return_value=1;
            /*print message to remove enter characters*/
            /*print_at(ptr->x, ptr->y, ptr->text);*/
            global[*ptr->value].func(0, &global[*ptr->value].data);
            erase_x_chars(5);
      }
      return((long) return_value);
}
/************************************************************
 *enter_int- changes value as an integer only
```

```
*  12/31/91
 ********************************************************/
long enter_int(short option, struct_data *ptr)
{
        char buf[80];
        long return_value=3;

sprintf(buf,"%s=%8ld :",ptr->text,*ptr->value);
        print_at(ptr->x, ptr->y, buf);

if(option)
        {
                return_value = read_term_return_choice ();
                if(return_value == 6 )
                        sscanf(ascii_in, "%ld",ptr->value);
                if(return_value==3 || return_value==6) return_value=1;

/*print message*/
                sprintf(buf,"%s=%8ld :",ptr->text,*ptr->value);
                print_at(ptr->x, ptr->y, buf);
                erase_x_chars(5);
        }
        return((long) return_value);
}
/***********************************************************
 *enter_intasfloat- allows long int to be entered in float
 *    form.  Scaling is 1000.
 * 12/31/91
 ********************************************************/
long enter_intasfloat(short option, struct_data *ptr)
{
        char buf[80];
        short return_value=3;
        float temp_float;

temp_float = ((float) *ptr->value)/1000.0;
        sprintf(buf,"%s=%8.3f :",ptr->text,temp_float);
        print_at(ptr->x, ptr->y, buf);

if(option)
        {
                return_value = read_term_return_choice ();
                if(return_value ==6)
                {
                        sscanf(ascii_in, "%f",&temp_float);
                        *ptr->value = (long) (1000.0 * temp_float);
                        return_value =  1;
                }
                if(return_value==3 || return_value==6) return_value=1;
                /*print message*/
                temp_float = ((float) *ptr->value)/1000.0;
                sprintf(buf,"%s=%8.3f :",ptr->text,temp_float);
                print_at(ptr->x, ptr->y, buf);
                erase_x_chars(5);
        }
        return( (long) return_value);
}
/***********************************************************
 *enter_rpm
 * 6/15/92
 ********************************************************/
```

```
long enter_rpm(short option, struct_data *ptr)
{
    char buf[80];
    short return_value=3;
    float temp_float;

temp_float = ((float) *ptr->value)/10.0;
    sprintf(buf,"%s=%8.1f :",ptr->text,temp_float);
    print_at(ptr->x, ptr->y, buf);

if(option)
    {
        return_value = read_term_return_choice ();
        if(return_value ==6)
        {
            sscanf(ascii_in, "%f",&temp_float);
            *ptr->value = (long) (10.0 * temp_float);
            return_value =  1;
        }
        if(return_value==3 || return_value==6) return_value=1;
        /*print message*/
        temp_float = ((float) *ptr->value)/10.0;
        sprintf(buf,"%s=%8.1f :",ptr->text,temp_float);
        print_at(ptr->x, ptr->y, buf);
        erase_x_chars(5);
    }
    return( (long) return_value);
}
/**************************************************************
 *enter_ma
 * 6/15/92
 **************************************************************/
long enter_ma(short option, struct_data *ptr)
{
    char buf[80];
    short return_value=3;
    float temp_float;

temp_float = ((float) *ptr->value)/186.13636;
    sprintf(buf,"%s=%8.1f :",ptr->text,temp_float);
    print_at(ptr->x, ptr->y, buf);

if(option)
    {
        return_value = read_term_return_choice ();
        if(return_value ==6)
        {
            sscanf(ascii_in, "%f",&temp_float);
            *ptr->value = (long) (186.13636 * temp_float);
            return_value =  1;
        }
        if(return_value==3 || return_value==6) return_value=1;
        /*print message*/
        temp_float = ((float) *ptr->value)/186.13636;
        sprintf(buf,"%s=%8.1f :",ptr->text,temp_float);
        print_at(ptr->x, ptr->y, buf);
        erase_x_chars(5);
    }
    return( (long) return_value);
}
/**************************************************************
 *enter_density-  displays density in lb/gals from the
```

```
*                  units of lb/ft^3 x 128
 * 3/5/92
 ***********************************************************/
long enter_density(short option, struct_data *ptr)
{
    char buf[80];
    short return_value=3;
    float temp_float;

temp_float = ((float) *ptr->value)/CON_lb_ft3_s7;
    sprintf(buf,"%s=%8.3f :",ptr->text,temp_float);
    print_at(ptr->x, ptr->y, buf);

if(option)
    {
        return_value = read_term_return_choice ();
        if(return_value ==6)
        {
            sscanf(ascii_in, "%f",&temp_float);
            *ptr->value = (long) (CON_lb_ft3_s7 * temp_float);
        }
        if(return_value==3 || return_value==6) return_value=1;
        /*print message*/
        temp_float = ((float) *ptr->value)/CON_lb_ft3_s7;
        sprintf(buf,"%s=%8.3f :",ptr->text,temp_float);
        print_at(ptr->x, ptr->y, buf);
        erase_x_chars(5);
    }
    return( (long) return_value);
}
/************************************************************
 *enter_spvol-   displays specific volume in gal/lb
 *               also removes the 2^21 scaling
 * 3/5/92
 ***********************************************************/
long enter_spvol(short option, struct_data *ptr)
{
    char buf[80];
    short return_value=3;
    float temp_float;

temp_float = ((float) *ptr->value)*CON_lb_ft3_s7/(SHIFT21*SHIFT7);
    sprintf(buf,"%s=%8.6f :",ptr->text,temp_float);
    print_at(ptr->x, ptr->y, buf);

if(option)
    {
        return_value = read_term_return_choice ();

if(return_value ==6)
        {
            sscanf(ascii_in, "%f",&temp_float);
            *ptr->value = (long) ( temp_float *(SHIFT21*SHIFT7)/CON_lb_ft3_s7);
        }
        if(return_value==3 || return_value==6) return_value=1;
        /*print message*/
        temp_float = ((float) *ptr->value)*CON_lb_ft3_s7/(SHIFT21*SHIFT7);
        sprintf(buf,"%s=%8.6f :",ptr->text,temp_float);
        print_at(ptr->x, ptr->y, buf);
```

```c
        erase_x_chars(5);
    }
    return( (long) return_value);
}
/***********************************************************
 *enter_as_percent- allows long int to be entered in float
 *    form. Routine assumes that the variable is from 0 to 10000
 *    representing actual numbers from 0 to 100%.
 * 3/04/92
 ***********************************************************/
long enter_as_percent (short option, struct_data *ptr)
{
    char buf[80];
    short return_value=3;
    float temp_float;

temp_float = ((float) *ptr->value)/100.0;
    if(text_length(ptr->text) > 1)
        sprintf(buf,"%s=%8.2f%%:",ptr->text,temp_float);
    else
        sprintf(buf,"%6.2f%%:",temp_float);

print_at(ptr->x, ptr->y, buf);

if(option)
    {
        return_value = read_term_return_choice ();
        if(return_value ==6)
        {
                sscanf(ascii_in, "%f",&temp_float);
                *ptr->value = (long) (100.0 * (temp_float + 0.005));
        }
        if(return_value==3 || return_value==6) return_value=1;
        /*print message*/
        temp_float = ((float) *ptr->value)/100.0;
        if(text_length(ptr->text) > 1)
            sprintf(buf,"%s=%8.2f%%:",ptr->text,temp_float);
        else
            sprintf(buf,"%6.2f%%:",temp_float);
        print_at(ptr->x, ptr->y, buf);
        erase_x_chars(5);
    }
    return( (long) return_value);
}
/***********************************************************
 *enter_intasfloat_I_min- allows long int to be entered in float
 *    also corrects for I being entered in minute units
 *    rather than seconds
 *    form.
 * 3/04/92
 ***********************************************************/
long enter_intasfloat_I_min(short option, struct_data *ptr)
{
    char buf[80];
    short return_value=3;
    float temp_float;

temp_float = ((float) *ptr->value)/(60.0*1000.0);
    sprintf(buf,"%s=%8.4fm:",ptr->text,temp_float);
    print_at(ptr->x, ptr->y, buf);
```

```
        if(option)
        {
                return_value = read_term_return_choice ();
                if(return_value ==6)
                {
                        sscanf(ascii_in, "%f",&temp_float);
                        *ptr->value = (long) (60.0*1000.0 * temp_float);
                }
                if(return_value==3 || return_value==6) return_value=1;
                /*print message*/
                temp_float = ((float) *ptr->value)/(60.0*1000.0);
                sprintf(buf,"%s=%8.4fm:",ptr->text,temp_float);
                print_at(ptr->x, ptr->y, buf);
                erase_x_chars(5);
        }
        return( (long) return_value);
}
/*********************************************************
 *enter_0to10000- allows long int to be entered in float
 *    with the integer scaling 100 rather than 1000
 *    Added specificly for entering in % units rather than decimal
 * 3/04/92
 *********************************************************/
long enter_0to10000 (short option, struct_data *ptr)
{
        char buf[80];
        short return_value=3;
        float temp_float;

if(!ptr->max_value) ptr->max_value = 100;
        temp_float   =   100.0*   ((float)   *ptr->value)/((float) ptr->max_value);
        sprintf(buf,"%s=%8.2f%%:",ptr->text,temp_float);
        print_at(ptr->x, ptr->y, buf);

if(option)
        {
                return_value = read_term_return_choice ();
                if(return_value ==6)
                {
                        sscanf(ascii_in, "%f",&temp_float);
                        *ptr->value = (long) (ptr->max_value * (temp_float + 0.005))/100;
                }
                if(return_value==3 || return_value==6) return_value=1;
                /*print message*/
                temp_float   =   100.0*   ((float)   *ptr->value)/((float) ptr->max_value);
                sprintf(buf,"%s=%8.2f%%:",ptr->text,temp_float);
                print_at(ptr->x, ptr->y, buf);
                erase_x_chars(8);
        }
        return( (long) return_value);
}
/*********************************************************
 * bit_on () returns 1 if bit in digital out is 1
 * MF 12/18/91
 * set_bit() sets bit to eighter 1 or 0
 *********************************************************/
#define ON_BIT  1
#define OFF_BIT 0
long dig_mask[] = {0x01, 0x02, 0x04,0x08,0x10,0x20,0x40,0x80,0x100,
```

```
0x200,0x400,0x800,0x1000,0x2000,0x4000,0x8000,0x10000,

0x20000,0x40000,0x80000,0x100000,0x200000,0x400000,

0x800000,0x1000000,0x2000000,0x4000000,0x8000000,

0x10000000,0x20000000,0x40000000,0x80000000};
long bit_on(int num_bit)
{
    if(~(not_digital_out) & dig_mask[num_bit])
        return(1);
    return(0);
}
long bit_on_2(int num_bit,long target)
{
    if(target & dig_mask[num_bit])
        return(1);
    return(0);
}
long set_bit_2(int on_off, int num_bit, long target)
{
    if(on_off)
    {
        target |= dig_mask[num_bit];
        return(1);
    }
    target &= ~(dig_mask[num_bit]);
    return(0);
}
long set_bit(int on_off, int num_bit)
{
    if(on_off)
    {
        not_digital_out &= ~(dig_mask[num_bit]);
        return(1);
    }
    not_digital_out |= dig_mask[num_bit];
    return(0);
}
/*************************************************************
 *digital_value - displays digital out in binary form
 *   allows value to be changed in binary also
 * 12/18/91
 *************************************************************/
long digital_value(short option, struct_data *ptr)
{
    char buf2[30], buf[10];
    short i, return_value=3;

not_digital_out = ~(mask_digital_out);
    for(i=0;i<8;i++)
    {
        if(bit_on(i))
            buf[7-i] = '1';
        else
            buf[7-i] = '0';
    }
    buf[8]=0;
    sprintf(buf2,"%s = %s:",ptr->text, buf);
    print_at(ptr->x, ptr->y, buf2);

if(option)
    {
```

```c
            print_at(ptr->x+20,ptr->y,"  87654321  \23312D");
            return_value = read_term_return_choice ();
            if(return_value ==3)
            {
                    for(i=0;i<8;i++)
                    {
                            if(!ascii_in[i]) break;
                            if(ascii_in[i] == '1') set_bit(ON_BIT,7-i);
                            if(ascii_in[i] == '0') set_bit(OFF_BIT,7-i);
                    }
                    return_value =1;
            }
            /*print message*/
            for(i=0;i<8;i++)
            {
                    if(bit_on(i))
                            buf[7-i] = '1';
                    else
                            buf[7-i] = '0';
            }
            buf[8]=0;
            sprintf(buf2,"%s = %s:",ptr->text, buf);
            print_at(ptr->x, ptr->y, buf2);
            erase_x_chars(10);
            mask_digital_out=~(not_digital_out);
            digital_out = mask_digital_out;
    }
    return((long) return_value);
}
/************************************************************
 * return_1- accepts a dummy long *ptr as input
 *    and returns 1 regardless
 ************************************************************/
long return_1(short option, struct_data *ptr)
{
    if(!option)   /*print message only if in non edit*/
            print_at(ptr->x, ptr->y, ptr->text);
    return(1);
}
/************************************************************
 * return_0- accepts a dummy long *ptr as input
 *    and returns 0 regardless
 ************************************************************/
long return_0(short option, struct_data *ptr)
{
    /*print message*/
    print_at(ptr->x, ptr->y, ptr->text);
    return(0);
}
/************************************************************
 * add_inuse - same as return_0 but adds the
 *        text "IN USE" after printing
 * 11/26/91
 ************************************************************/
long add_inuse(short option, struct_data *ptr)
{
    char buf[80];
    /*print message*/
    sprintf(buf,"%s %s",ptr->text, "IN USE");
    print_at(ptr->x, ptr->y, buf);
    return(0);
}
/************************************************************
```

```c
 * return_choice- accepts a dummy long *ptr as input
 *    and returns 0 regardless.  This fakes a q
 **********************************************************/
long return_choice(short option, struct_data *ptr)
{
    short return_value=3;
    char buf[50];

/*print message*/
    sprintf(buf,"%s (%ld): ",ptr->text, ptr->max_value);
START_RETURN_CHOICE:
    print_at(ptr->x, ptr->y, buf);

if(option)
    {
        return_value = read_term_return_choice ();
        if(ascii_in[0] == 'v')
        {
            long temp;
            temp = ptr->max_value;
            change_globals();
            ptr->max_value = temp;
            goto START_RETURN_CHOICE;
        }
        if(return_value ==6 || return_value == 3)
        {
            sscanf(ascii_in, "%ld", &ptr->max_value);
            return_value =  0;
        }
    }
    return((long) return_value);
}

/**********************************************************
 * auto_manual - displays AUTO or MANUAL depending on value
 *     of ptr->max_value. To toggle a t is pressed.
 * 11/20/91
 **********************************************************/
long auto_manual(short option, struct_data *ptr)
{
    char auto_text[]   = {"AUTO  "};
    char manual_text[]= {"MANUAL"};
    char nop_text[]    = {"NOP   "};
    short return_value=3, current;

/*print message*/
    current = function[loop_struct[ptr->max_value].option].option;
    if(current ==AUTO)
        print_at(ptr->x, ptr->y, auto_text);
    if(current== MANUAL)
        print_at(ptr->x, ptr->y, manual_text);
    if(current == NOT_USED)
        print_at(ptr->x, ptr->y, nop_text);

if(option )
    {
        return_value = read_term_return_choice ();
        if(return_value ==3 && ascii_in[0] =='t')   /*toggle*/
        {
            if ( current == AUTO  &&
loop_struct[ptr->max_value].option)
```

```c
            function[loop_struct[ptr->max_value].option].option=MANUAL;
            if (current == MANUAL && loop_struct[ptr->max_value].option)

function[loop_struct[ptr->max_value].option].option=AUTO;
            current = function[loop_struct[ptr->max_value].option].option;
            return_value=1;
        }
        else if(return_value==3 && ascii_in[0]=='v')  /*edit main vars*/
        {
            change_globals_master();
            return(2);
        }
        if(return_value==3 || return_value==6) return_value=1;
        /*print message*/
        if(current == AUTO)
            print_at(ptr->x, ptr->y, auto_text);
        else if(current == MANUAL)
            print_at(ptr->x, ptr->y, manual_text);
        else if(current == NOT_USED)
            print_at(ptr->x, ptr->y, nop_text);
        erase_x_chars(5);
    }
    return((long) return_value);
}

/*************************************************************
 * loop_text - displays loop text
 *   11/20/91
 *************************************************************/
long loop_text(short option, struct_data *ptr)
{
    /*print message*/
    print_at(ptr->x, ptr->y, loop_struct[ptr->max_value].text);
    return(1);
}
/*************************************************************
 * current_choice - displays current function choice
 *   11/20/91
 *************************************************************/
long current_choice(short option, struct_data *ptr)
{
    char buf[80];
    /*print message*/
    sprintf(buf,"%s%s",ptr->text,function[ptr->max_value].text);
    print_at(ptr->x, ptr->y, buf);
    return(0);
}
/*************************************************************
 * function_text - displays function text
 *************************************************************/
long function_text(short option, struct_data *ptr)
{
    short return_value=3;
    /*print message*/
    print_at(ptr->x, ptr->y, function[loop_struct[ptr->max_value].option].text);

if(option)
```

```
{
        return_value = read_term_return_choice ();
        if(return_value==3 && ascii_in[0]=='c')
        {
                display_function(ptr->max_value);
                /*display_function displays the choices of functions*/
                /*and returns the choice.  Sets the option switch to*/
                /*MANUAL. and the old switch to NOT_USED*/
                return(2);
        }
        if(return_value==3   &&   ascii_in[0]=='e')   /*edit functions*/
        {
                loop_struct[ptr->max_value].func(EDIT_TERMINAL);
                return(2);
        }
        if(return_value==3 && ascii_in[0]=='v')   /*edit main vars*/
        {
                change_globals_master();
                return(2);
        }
        if(return_value==3 || return_value==6) return_value=1;
        print_at(ptr->x, ptr->y, function[loop_struct[ptr->max_value].option].text);
        erase_x_chars(5);
    }
    return((long) return_value);
}
/************************************************************
 * display_function - returns the choice of function
 *  11/20/91
 ************************************************************/
long display_function(long loop_num)
{
    short i,j=1, k = 0;
    short current;
    struct_com enter[TOTAL_FUNCTIONS];
    struct_com choose[2] = {
        1, 22, 0, 0, "Enter Choice", return_choice,
        1, 21, 0, 0, "Current Choice: ", current_choice};

for(i=0;i<TOTAL_FUNCTIONS;i++)
    {
        if(k++==10)
        {   k = 1;
            j+=30;
        }
        enter[i].data.text = function[i].text;
        enter[i].data.x = j; enter[i].data.y =k;
        if(function[i].option == NOT_USED)
            enter[i].func = return_0;
        else
            enter[i].func = add_inuse;      /*add IN USE after text*/
    } current = loop_struct[loop_num].option;
    choose[0].data.max_value = current;
    display_choices(CLEAR_BUILD, 0,TOTAL_FUNCTIONS, enter);
```

```c
        display_choices(BUILD, 0, 2, choose);
        /*choice is already in use*/
        if(function[choose[0].data.max_value].option !=NOT_USED &&
            choose[0].data.max_value)
                return(0);
        if(choose[0].data.max_value > -1 && choose[0].data.max_value
<TOTAL_FUNCTIONS)
        {
                function[current].option = NOT_USED;
                function[choose[0].data.max_value].option = MANUAL;
                if(!choose[0].data.max_value)
                        function[choose[0].data.max_value].option   =
NOT_USED;
                loop_struct[loop_num].option = choose[0].data.max_value;
                loop_struct[loop_num].func   =
function[loop_struct[loop_num].option].func;
        }
        return(loop_struct[loop_num].option);
}
/************************************************************
 * sign() returns sign of argument
 *              +1 for positive numbers
 *              -1 for negative numbers
 *              +1 for zer0
 * 12/11/91
 ************************************************************/
long sign(long num)
{
        if(num < 0)   return(-1);
        return(1);
}

/************************************************************
 * time_display - returns ptr to time string
 *                        hh:mm:ss.00
 * 12/16/91
 ************************************************************/
        /*t is hundreths*/
long display_time(char *buf, long t)
{
        int thousand, sec, min;
        thousand = t % 100;
        t = t/100;
        sec =  t % 60;
        t /=60;
        min =  t % 60;
        t /=60;
        sprintf(buf,"Time %2li:%2i:%2i.%i",t,min,sec,thousand);
        return(t);
}

/************************************************************
 * change_global_variable - passed in is the number of global
 *     variable to change.
 * 3/10/92
 ************************************************************/
int change_global_variable(short num)
{
                print_at(1,1,"                                    ");
                global[num].data.x=1;
                global[num].data.y=1;
```

```c
            global[num].func(1, &global[num].data);
            return(0);
}
/***********************************************************/
/***********************************************************
 * print_heading-
 * 2/26/92
 ***********************************************************/
long print_heading(struct_display_var *dis)
{
    short i;
    print_printbuf("time  ");
    for(i=1;i<=dis->num_of_vars;i++)
    {
        print_printbuf(global[dis->var[i]].data.text);
        OUTCHR(0x20);
    }
    OUTCHR(0x0D); OUTCHR(0x0B); OUTCHR(0x04);

return(1);
}
/***********************************************************
 * print_var-
 * 2/26/92
 ***********************************************************/
long print_var(struct_display_var *dis)
{
    short i;
    char key;
    char buf[15];
    clear_old_message();
    do
    {
        if(ascii_message())
        {
            key= buffer_in[6];
            switch(key)
            {
            case 'h':
                print_heading(dis);
                break;
            case 'm':
                print_message("message: ");
                OUTCHR(0x0D); OUTCHR(0x0B); OUTCHR(0x04);
                break;
            case 'q':
                break;
            default:
                {
                int num;
                long temp;
                print_message("Change Global (#,value): ");
                sscanf(ascii_in,"%d, %ld",&num, &temp);
                if(num>0 && num < global_num)
                    *global[num].data.value = temp;
                OUTCHR(0x0D); OUTCHR(0x0B); OUTCHR(0x04);
                }
                break;
            }
            clear_old_message();
        }
        if(time % (10 * dis->step) == 7)
        {
```

```c
            for(i=0;i<=dis->num_of_vars;i++)
            {
                    sprintf(buf," %ld ",*global[dis->var[i]].data.value);
                    print_printbuf(buf);
            }
            OUTCHR(0x0D); OUTCHR(0x0B); OUTCHR(0x04);
        }
    }while(key !='q');
    return(1);
}

/*************************************************************
 * display global variable routine
 * 2/25/92
 *************************************************************/
long display_vars(short edit0_run1)
{
    static struct_display_var dis;

switch(edit0_run1)
    {
    case EDIT_TERMINAL: /*edit pid parameters*/
        {
        struct_com enter[]={
            5,  3,  0,0, "Step Size (Minimum = 1) ", enter_int,
            5,  4,  0,0, "Number of Variables     ", enter_int,
            5,  5,  0,0, "Variable 1   ", point_value,
            5,  6,  0,0, "Variable 2   ", point_value,
            5,  7,  0,0, "Variable 3   ", point_value,
            5,  8,  0,0, "Variable 4   ", point_value,
            5,  9,  0,0, "Variable 5   ", point_value,
            5, 10,  0,0, "Variable 6   ", point_value,
            5, 11,  0,0, "Variable 7   ", point_value,
            5, 12,  0,0, "Variable 8   ", point_value,
            5, 13,  0,0, "Variable 9   ", point_value};
        if(dis.step < 1) dis.step = 1;
        enter[0].data.value = &dis.step;
        enter[1].data.value = &dis.num_of_vars;
        enter[2].data.value = &dis.var[1];
        enter[3].data.value = &dis.var[2];
        enter[4].data.value = &dis.var[3];
        enter[5].data.value = &dis.var[4];
        enter[6].data.value = &dis.var[5];
        enter[7].data.value = &dis.var[6];
        enter[8].data.value = &dis.var[7];
        enter[9].data.value = &dis.var[8];
        enter[10].data.value = &dis.var[9];
        display_choices(CLEAR_BUILD, 0, 11, enter);
        } dis.var[0] = 0;    /*time is 0*/
        dis.num_of_vars = min(9,dis.num_of_vars);
        dis.num_of_vars = max(0,dis.num_of_vars);

clear_the_screen();
        print_at(20,10,"Type 's' to Start Display ");
        read_term_return_choice(); /*reads into ascii_in*/
        if(ascii_in[0] =='s')
        {
            OUTCHR(0x0D); OUTCHR(0x0B); OUTCHR(0x04);
            print_heading(&dis);
```

```
                print_var(&dis);
                OUTCHR(0x0D); OUTCHR(0x0B); OUTCHR(0x04);
                print_message("Turn off Collection Routine (Press
Enter to Continue)");
            }
            break;
        case INITIALIZE_VARIABLES:
                dis.step = 1;
                dis.num_of_vars=5;
                dis.var[0]= 0;
                dis.var[1]= 1;
                dis.var[2]= 2;
                dis.var[3]= 3;
                dis.var[4]= 4; /**/
                dis.var[5]= 5; /**/
                dis.var[6]= 6; /**/
                dis.var[7]= 7; /**/
                dis.var[8]= 8; /**/
                dis.var[9]= 9; /**/
            break;
        default:
            break;
    } /*end of switch*/
    return(1);

}
```

What is claimed is:

1. A method of changing a rotatable member of a material delivery apparatus from a static friction state to a dynamic friction state, comprising:

receiving in a computer a signal indicating rotational speed of the rotatable member;

providing in the computer a register for receiving a primary control drive signal generated by the computer under a primary control program to operate the rotatable member at a desired material delivery speed;

communicating the contents of the register to control the operation of the rotatable member; and performing in the computer concurrently with the primary control program a program for unsticking a stuck rotatable member, including:

determining in the computer whether a primary control drive signal has been generated by the primary control program;

incrementing a time counter in the computer in response to the lapse of predetermined time increments;

determining in the computer whether the time counter has counted an elapsed time less than a predetermined time period;

determining in the computer, from the signal received therein indicating rotational speed of the rotatable member, whether the rotatable member is rotating;

in response to determining in the computer that a primary control signal has been generated and that the elapsed time is less than the predetermined time period and that the rotatable member is not rotating, generating in the computer an unstick drive signal; and overwriting the primary control drive signal in the register with the unstick drive signal to control the rotatable member therewith instead of controlling the rotatable member with the primary control drive signal concurrently generated by the primary control program during operation of the program for unsticking a stuck rotatable member.

2. A method of automatically controlling a sand screw for conveying proppant into a fracturing fluid at an oil or gas well, comprising:

(a) receiving, in a computer connected at the oil or gas well for controlling the sand screw, a signal indicating rotational speed of the sand screw;

(b) providing in the computer a register for receiving a primary control drive signal generated by the computer under a primary control program to operate the sand screw at a desired proppant delivery speed;

(c) communicating the contents of the register to control the operation of the sand screw; and (d) performing in the computer concurrently with the primary control program, and commencing at start-up of the sand screw, a program for unsticking a stuck sand screw, including:

(d1) determining in the computer whether a primary control drive signal has been generated by the primary control program;

(d2) incrementing a time counter in the computer in response to the lapse of predetermined time increments;

(d3) determining in the computer whether the time counter has counted an elapsed time less than a predetermined time period;

(d4) determining in the computer, from the signal received therein indicating rotational speed of the sand screw, whether the sand screw is rotating;

(d5) in response to determining in the computer that a primary control signal has been generated and that the elapsed time is less than the predetermined time period and that the sand screw is not rotating, generating in the computer an unstick drive signal;

(d6) overwriting the primary control drive signal in the register with the unstick drive signal to control the sand screw therewith instead of controlling the sand screw with the primary control drive signal concurrently generated by the primary control program during operation of the program for unsticking a stuck sand screw;

(d7) repeating steps (d1) through (d6) until determining that rotation of the sand screw has occurred or determining that the time counter has counted an elapsed time not less than the predetermined time period; and wherein the unstick drive signal is generated by selecting a predetermined magnitude from memory within the computer in response to the elapsed time in the time counter for each repetition of said steps (d1) through (d6).

3. A method as defined in claim 2, wherein:

the sand screw is driven by a hydraulic motor operated by a hydraulic motor drive system responsive to electrical signals communicated thereto in response to drive signals stored in the register of the computer; and one such electrical signal, which is responsive to an unstick drive signal overwritten into the register, has a magnitude within the range between 40 percent and 70 percent of a maximum signal that could be applied to the hydraulic motor drive system.

4. A method as defined in claim 3, wherein the hydraulic motor drive system includes a variable displacement hydraulic pump having a swash plate operated by said one such electrical signal to provide flow rate from the pump to the hydraulic motor sufficient to drive the sand screw at maximum torque.

5. A method as defined in claim 3, wherein the hydraulic drive system includes a pressure compensated hydraulic pump and an outlet valve responsive to said one such electrical signal so that maximum torque is applied to the sand screw in response thereto.

* * * * *